US012555338B2

United States Patent
Salter et al.

(10) Patent No.: US 12,555,338 B2
(45) Date of Patent: Feb. 17, 2026

(54) PRESENTING VIRTUAL ELEMENTS ASSOCIATED WITH A PRODUCT IN AN ENVIRONMENT

(71) Applicant: Apple Inc., Cupertino, CA (US)

(72) Inventors: Thomas G. Salter, San Francisco, CA (US); Jeffrey S. Norris, Saratoga, CA (US); Christopher I. Word, San Francisco, CA (US); Peter Burgner, Venice, CA (US); Michael R. Alger, Mountain View, CA (US); Thomas J. Moore, Northglenn, CO (US); Evan Jones, Kirkland, WA (US); Ashwin K. Vijay, Sunnyvale, CA (US); Tigran Khachatryan, North Hills, CA (US); Michael J. Rockwell, Palo Alto, CA (US); Anshu K. Chimalamarri, Sunnyvale, CA (US); Benjamin S. Phipps, San Francisco, CA (US); Sanjana Wadhwa, San Francisco, CA (US); Jessica Trinh, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/890,601

(22) Filed: Sep. 19, 2024

(65) Prior Publication Data
US 2025/0111625 A1    Apr. 3, 2025

Related U.S. Application Data

(60) Provisional application No. 63/586,965, filed on Sep. 29, 2023, provisional application No. 63/686,612, filed on Aug. 23, 2024.

(51) Int. Cl.
*G06T 19/00*    (2011.01)
*G06F 3/01*    (2006.01)
(Continued)

(52) U.S. Cl.
CPC ............ *G06T 19/006* (2013.01); *G06F 3/017* (2013.01); *G06Q 30/0631* (2013.01); *G06V 20/20* (2022.01)

(58) Field of Classification Search
CPC ... G06T 19/006; G06F 3/017; G06Q 30/0631; G06V 20/20
See application file for complete search history.

(56) References Cited

U.S. PATENT DOCUMENTS 7,096,120 B2    8/2006 Hull
9,612,722 B2    4/2017 Miller et al.
(Continued)

FOREIGN PATENT DOCUMENTS

CN    108519818 A    9/2018
CN    116132905 A    5/2023
(Continued)

OTHER PUBLICATIONS

Klavins, Ainars, 10 Augmented Reality Retail Examples for Better Customer Experience, Retrieved from the internet: <https://overlyapp.com/blog/10-augmented-reality-retail-examples-for-customer-experiences/>, [retrieved on Jan. 14, 2025], May 13, 2023, 21 pages.
(Continued)

*Primary Examiner* — Stephen G Sherman
(74) *Attorney, Agent, or Firm* — Kubota & Basol LLP

(57) ABSTRACT

Some examples of the disclosure are directed to systems and methods for performing one or more actions in response to detecting a product in a physical environment. For example, performing the one or more actions include presenting one or more virtual elements in an environment. For example, performing the one or more actions include storing information associated with the product. In some examples, the one or more actions are performed in accordance with one or more criteria being satisfied. For example, the one or
(Continued)

more criteria include a criterion that is satisfied when one or more indications of user interest in the product are detected. In some examples, one or more virtual elements are presented in an environment indicating a location of a product within a region of the physical environment. The methods of the disclosure are optionally performed at an electronic device including a head-mounted display.

24 Claims, 27 Drawing Sheets

(51) Int. Cl.
*G06Q 30/0601* (2023.01)
*G06V 20/20* (2022.01)

(56) References Cited

U.S. PATENT DOCUMENTS

| | | | |
|---|---|---|---|
| 10,448,189 B2 | 10/2019 | Link | |
| 10,929,099 B2 | 2/2021 | Querze et al. | |
| 11,094,124 B1* | 8/2021 | Schweinfurth | G16H 40/20 |
| 11,321,758 B1* | 5/2022 | Kwatra | G06Q 30/0639 |
| 2017/0161457 A1* | 6/2017 | Meredith | G16H 40/67 |
| 2021/0090156 A1* | 3/2021 | Deveaux | G06F 16/955 |
| 2022/0279303 A1 | 9/2022 | Marculescu et al. | |
| 2022/0358570 A1* | 11/2022 | Agrawal | G06Q 30/0643 |
| 2024/0103616 A1 | 3/2024 | Yerkes et al. | |
| 2025/0078146 A1* | 3/2025 | Singh | G06F 3/04845 |

FOREIGN PATENT DOCUMENTS

| | | | |
|---|---|---|---|
| CN | 117857981 A | 4/2024 | |
| CN | 118102204 A | 5/2024 | |
| WO | WO-2016183541 A1 * | 11/2016 | H04L 63/168 |
| WO | 2023/043646 A1 | 3/2023 | |

OTHER PUBLICATIONS

Makarov, Andrew, Augmented Reality Transforms In-Store Navigation, Retrieved from the internet: <https://retailnext.net/blog/augmented-reality-transforms-in-store-navigation>, [retrieved on Jan. 14, 2025], Jan. 16, 2020, 9 pages.

Salpini, Cara, Why Virtual Reality Won't Revolutionize Retail, but Scan-and-go Will, Retrieved from the internet: <https://www.retaildive.com/news/why-virtual-reality-wont-revolutionize-retail-but-scan-and-go-will/526706/>, [retrieved on Jan. 14, 2025], Jul. 3, 2018, 11 pages.

Wagaine, Matthew, 9 Augmented Reality Grocery Shopping Examples, Retrieved from the internet: <https://poplar.studio/blog/augmented-reality-grocery-shopping-examples/>, [retrieved on Jan. 14, 2025], May 20, 2022, 21 pages.

* cited by examiner

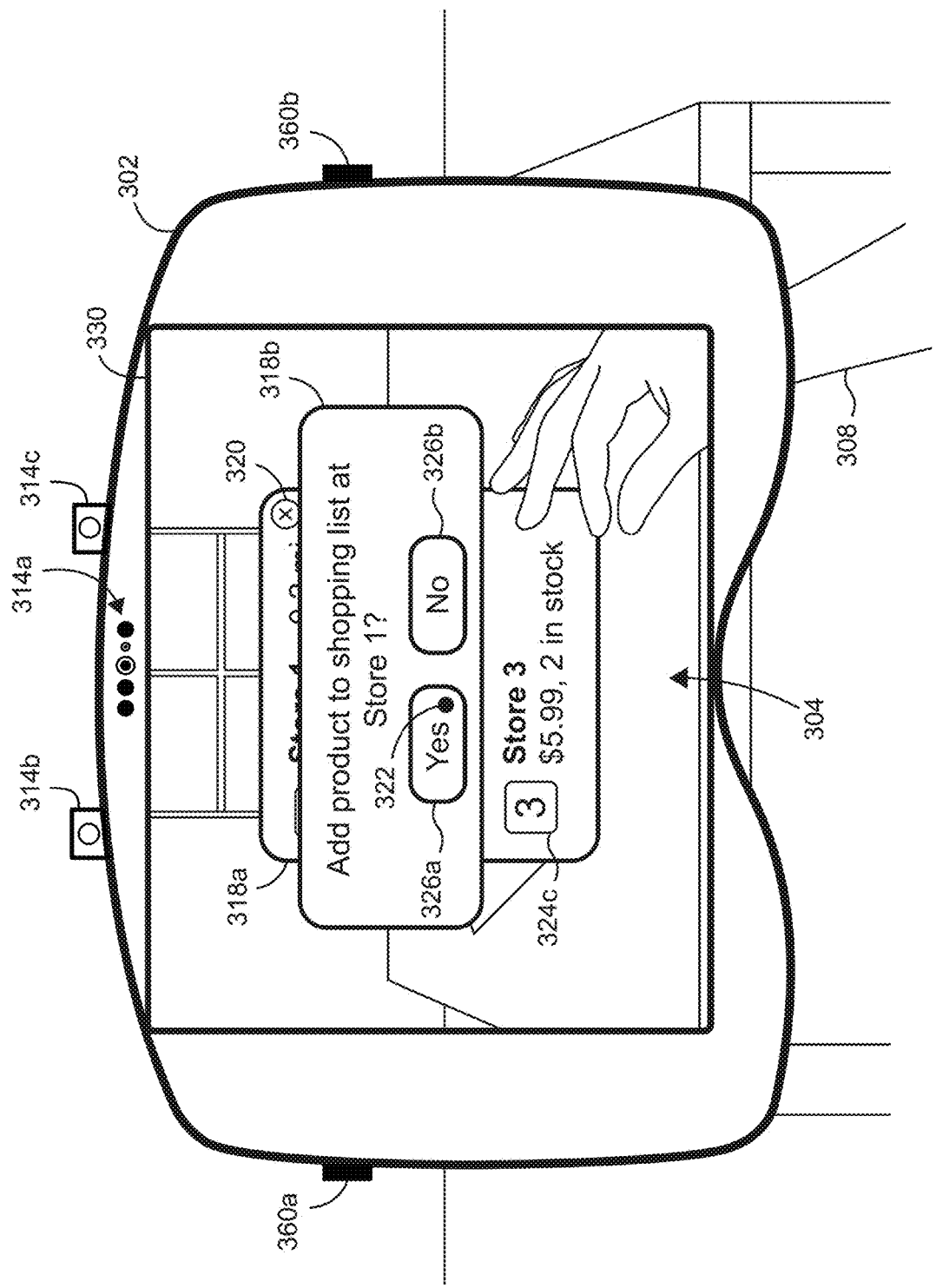

600

602 — Detect a location of the electronic device in a physical environment

604 — In accordance with a determination that the location of the electronic device satisfies one or more first criteria, the one or more first criteria including a first criterion that is satisfied when the location of the electronic device is within a first region of the physical environment that includes a first location corresponding to a first product, wherein the first product is associated with one or more indications of user intent to purchase the first product and the one or more indications of the user intent are detected by the electronic device:

606 — Present, via the one or more displays, one or more first virtual elements in an environment indicating the first location of the first product within the first region of the physical environment

FIG. 6

PRESENTING VIRTUAL ELEMENTS ASSOCIATED WITH A PRODUCT IN AN ENVIRONMENT

CROSS-REFERENCE TO RELATED APPLICATIONS

This application claims the benefit of U.S. Provisional Application No. 63/586,965, filed Sep. 29, 2023, and U.S. Provisional Application No. 63/686,612, filed Aug. 23, 2024, the contents of which are herein incorporated by reference in their entireties for all purposes.

FIELD OF THE DISCLOSURE

This relates generally to systems and methods for presenting virtual elements in an environment.

BACKGROUND OF THE DISCLOSURE

Some computer graphical environments provide two-dimensional and/or three-dimensional environments where at least some objects displayed for a user's viewing are virtual and generated by a computer. For example, virtual objects are viewable in environments concurrently with one or more objects of a physical environment.

SUMMARY OF THE DISCLOSURE

Some examples of the disclosure are directed to systems and methods for performing one or more actions that are associated with a product in a physical environment. For example, the one or more actions include presenting one or more virtual elements in an environment associated with the product. In some examples, at an electronic device in communication with one or more displays and one or more input devices, the electronic device detects, via the one or more input devices, a first product in a physical environment of a user of the electronic device. In some examples, in accordance with a determination that one or more first criteria are satisfied, the one or more first criteria including a first criterion that is satisfied when the electronic device detects one or more indications of interest of the user of the electronic device in the first product, the electronic device performs one or more actions.

In some examples, the first product is a good that is included in the physical environment. For example, the first product includes different types of hardware, household goods and/or grocery items. In some examples, detecting the one or more indications of interest include detecting attention of the user directed to the first product. In some examples, detecting the one or more indications of interest include detecting a hand gesture performed by the user directed to the first product. In some examples, detecting the one or more indications of interest include detecting user interaction with the first product in the physical environment. In some examples, the one or more actions include presenting a first virtual element associated with the first product in an environment. In some examples, the first virtual element includes one or more visual indications of one or more regions (e.g., store/businesses) at which the first product is available to be purchased. In some examples, the one or more actions include adding information associated with the first product to a repository of information associated with a respective application. For example, the electronic device adds the first product to a shopping list included in a file of the respective application.

In some examples, at an electronic device in communication with one or more displays and one or more input devices, the electronic device detects a location of the electronic device in a physical environment. In some examples, in accordance with a determination that the location of the electronic device satisfies one or more first criteria, the one or more first criteria including a first criterion that is satisfied when the location of the electronic device is within a first region of the physical environment that includes a first location corresponding to a first product, wherein the first product is associated with one or more indications of user intent to purchase the first product and the one or more indications of the user intent are detected by the electronic device, the electronic device presents, via the one or more displays, one or more first virtual elements in an environment indicating the first location of the first product within the first region of the physical environment.

In some examples, the first region of the physical environment corresponds to a store, and the first location corresponding to the first product corresponds to a location within the store. In some examples, the one or more indications of the user intent detected by the electronic device include detected attention of a user of the electronic device directed to the first product, user interaction with the first product and/or identified information associated with the first product included in a file of an application. In some examples, the electronic device detects the one or more indications of the user intent at a second location that is outside of the first region of the physical environment. For example, the electronic device detects the one or more indications of user intent at a location of the physical environment that is not within the store at which the first product is available to be purchased.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIGS. 3A-3I illustrate an exemplary method for presenting one or more virtual elements in an environment that are associated with a product according to some examples of the disclosure.

FIG. 6 illustrates a flow diagram for an example process for presenting one or more virtual elements associated with

DETAILED DESCRIPTION

Figure 1:
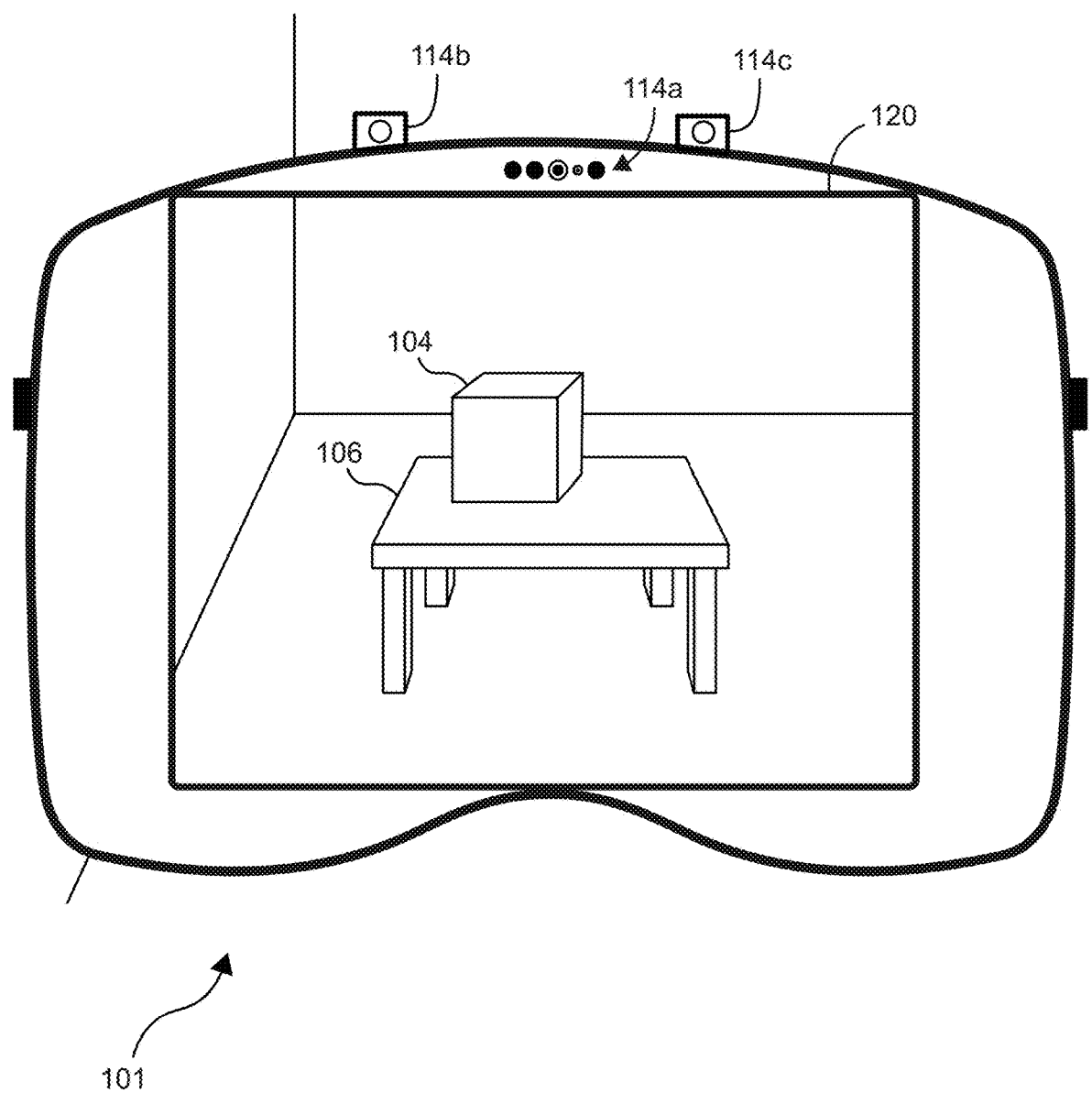
FIG. 1 illustrates an electronic device presenting an extended reality environment according to some examples of the disclosure.

Some examples of the disclosure are directed to systems and methods for performing one or more actions that are associated with a product in a physical environment. For example, the one or more actions include presenting one or more virtual elements in an environment associated with the product. In some examples, at an electronic device in communication with one or more displays and one or more input devices, the electronic device detects, via the one or more input devices, a first product in a physical environment of a user of the electronic device. In some examples, in accordance with a determination that one or more first criteria are satisfied, the one or more first criteria including a first criterion that is satisfied when the electronic device detects one or more indications of interest of the user of the electronic device in the first product, the electronic device performs one or more actions.

In some examples, the first product is a good that is included in the physical environment. For example, the first product includes different types of hardware, household goods and/or grocery items. In some examples, detecting the one or more indications of interest include detecting attention of the user directed to the first product. In some examples, detecting the one or more indications of interest include detecting a hand gesture performed by the user directed to the first product. In some examples, detecting the one or more indications of interest include detecting user interaction with the first product in the physical environment. In some examples, the one or more actions include presenting a first virtual element associated with the first product in an environment. In some examples, the first virtual element includes one or more visual indications of one or more regions (e.g., store/businesses) at which the first product is available to be purchased. In some examples, the one or more actions include adding information associated with the first product to a repository of information associated with a respective application. For example, the electronic device adds the first product to a shopping list included in a file of the respective application.

In some examples, at an electronic device in communication with one or more displays and one or more input devices, the electronic device detects a location of the electronic device in a physical environment. In some examples, in accordance with a determination that the location of the electronic device satisfies one or more first criteria, the one or more first criteria including a first criterion that is satisfied when the location of the electronic device is within a first region of the physical environment that includes a first location corresponding to a first product, wherein the first product is associated with one or more indications of user intent to purchase the first product and the one or more indications of the user intent are detected by the electronic device, the electronic device presents, via the one or more displays, one or more first virtual elements in an environment indicating the first location of the first product within the first region of the physical environment.

In some examples, the first region of the physical environment corresponds to a store, and the first location corresponding to the first product corresponds to a location within the store. In some examples, the one or more indications of the user intent detected by the electronic device include detected attention of a user of the electronic device directed to the first product, user interaction with the first product and/or identified information associated with the first product included in a file of an application. In some examples, the electronic device detects the one or more indications of the user intent at a second location that is outside of the first region of the physical environment. For example, the electronic device detects the one or more indications of user intent at a location of the physical environment that is not within the store at which the first product is available to be purchased.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114a oriented towards a face of the user (e.g., eye tracking cameras described below with reference to FIG. 2). In some examples, internal image sensors 114a are used for eye tracking (e.g., detecting a gaze of the user). Internal image sensors 114a are optionally arranged on the left and right portions of display 120 to enable eye tracking of the user's left and right eyes. In some examples, electronic device 101 also includes external image sensors 114b and 114c facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114b and 114c). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114b and 114c.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
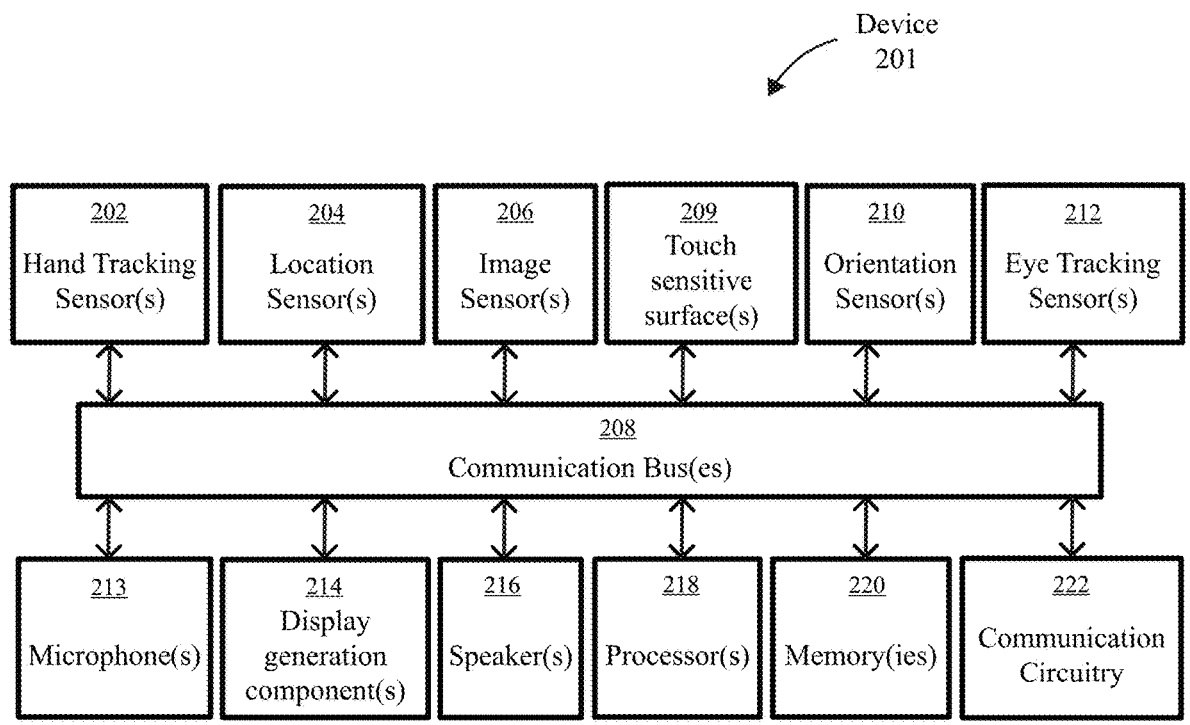
FIG. 2 illustrates a block diagram of an example architecture for a device according to some examples of the disclosure.

FIG. 2 illustrates a block diagram of an example architecture for a device 201 according to some examples of the disclosure. In some examples, device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114a and/or external image sensors 114b and 114c in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global positioning system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Attention is now directed towards an electronic device (e.g., corresponding to electronic device 201) performing one or more actions in response to detecting one or more products in a physical environment. For example, the electronic device presents one or more virtual elements associated with one or more products in an environment (e.g., a three-dimensional environment). For example, the electronic device stores information associated with the one or more products in a repository of information associated with a respective application. In some examples, the electronic device performs the one or more actions when one or more indications of interest of a user of the electronic device in the product are detected. In some examples, the electronic device presents one or more virtual elements associated with a product in an environment when a location of the electronic device is within a region of a physical environment that includes one or more locations corresponding to one or more products.

FIGS. 3A-3I illustrate an exemplary method for presenting one or more virtual elements in an environment that are associated with a product that has a quantity that is less than a threshold amount, according to some examples of the disclosure. Particularly, the one or more virtual elements are presented in the environment by an electronic device 302. In some examples, electronic device 302 has one or more characteristics of electronic device 101 and/or electronic device 201 as described above. In some examples, electronic device 302 is a head-mounted display that includes a display generation component 330 (e.g., or optionally one or more display generation components that have one or more characteristics of display generation component(s) 214 as described above) that presents an environment 304 to a user (e.g., using a transparent and/or translucent display). In some examples, electronic device 302 includes one or more image sensors 314*a*-314*c* (e.g., image sensors 314*a*-314*c* include one or more characteristics of image sensors 114*a*-114*c* and/or image sensor(s) 206 as described above) configured to detect a physical environment (e.g., having one or more characteristics of a real-world environment and/or physical environment described above) and/or movements of one or more portions of a user (e.g., hands, head and/or eyes) and/or attention (e.g., gaze) of a user. In some examples, electronic device 302 includes one or more hardware input devices. For example, electronic device 302 includes hardware buttons 360*a* and 360*b* that can be actuated by a user of electronic device 302 (e.g., while wearing electronic device 302). In some examples, the one or more hardware input devices include one or more buttons, knobs, dials, switches, crowns, touchscreens (e.g., touch-sensitive display), trackpads and/or keyboards. In some examples, electronic device 302 is a head-mounted camera device in communication with a display. For example, electronic device 302 includes the one or more image sensors 314*a*-314*c* configured to detect the physical environment and is in communication with a second electronic device with a display component (e.g., a mobile phone, tablet, wearable device (e.g., a smart watch) and/or a laptop).

In some examples, environment 304, shown in FIGS. 3A-3I, is a three-dimensional environment that is presented to the user of electronic device 302 through display generation component 330 (e.g., display generation component 330 is a transparent or translucent display). In some examples, environment 304 is an extended reality (XR) environment having one or more characteristics of an XR environment described above. For example, from a current viewpoint of the user of electronic device 302, one or more virtual elements (e.g., virtual element 318a shown and described with reference to FIG. 3E) and/or one or more physical objects (e.g., real-world table 106 as shown and described with reference to FIG. 1) from a physical environment of the user of electronic device 302 are visible (e.g., through video passthrough or optical see-through of the physical environment that is visible to the user of electronic device 302 through display generation component 330). In some examples, environment 304 is a virtual reality environment (e.g., environment 304 is fully or partially immersive (e.g., a user of electronic device 302 controls a level of virtual immersion through one or more input devices of electronic device 302)).

In some examples, the one or more virtual elements (e.g., virtual element 318a shown and described with reference to FIG. 3E) are displayed by a display component in communication with electronic device 302 (e.g., instead of presenting the one or more virtual elements in a virtual environment, such as environment 304). For example, electronic device 302 detects one or more inputs (e.g., through detection of the physical environment) using image sensors 314a-314c, and, in response to detecting the one or more inputs, the one or more virtual elements (e.g., virtual element 318a) are displayed on the display component (e.g., the content is displayed on a display of a mobile phone in communication with electronic device 302). For example, electronic device 302 does not include one or more displays (e.g., display generation component 330) and does not present a three-dimensional environment (e.g., environment 304) to the user of electronic device 302.

Figure 3A:
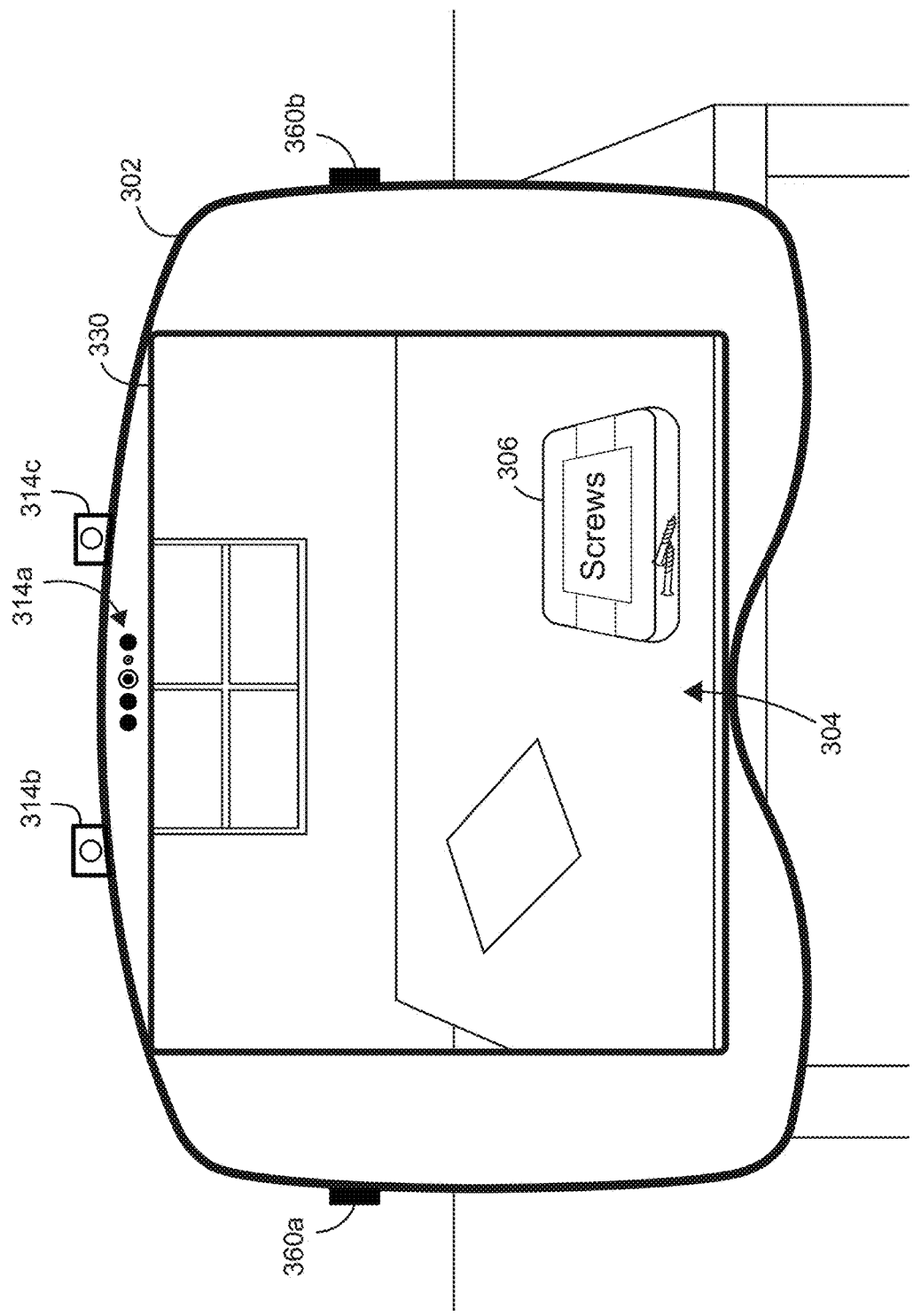

FIG. 3A illustrates a product 306 that is visible to a user of electronic device 302 through display generation component 330. In some examples, product 306 is included in a physical environment that is visible to the user of electronic device 302 through video passthrough or optical see-through. As shown in FIG. 3A, product 306 is a package of screws. It should be understood that, in some examples, a product can include different types of hardware (e.g., nails) or other goods, such as household goods (e.g., soap, cleaners, light bulbs, and/or batteries), toiletries (e.g., shampoo, shaving cream, toothpaste, and/or medicine), beverages, condiments, spices, paper, wrap, fruits, vegetables, and/or other types of grocery items. In some examples, electronic device 302 detects product 306 (e.g., product 306 is within the field-of-view of image sensors 314a-314c of electronic device 302). In some examples, product 306 is detected using image and/or object recognition (e.g., using image sensors 314a-314c). For example, electronic device 302 recognizes the packaging of product 306 (e.g., the size, shape, color and/or label(s) included on the packaging). For example, electronic device 302 recognizes product 306 by detecting one or more objects of product 306 (e.g., electronic device 302 detects one or more screws included inside of the packaging and/or identifies product 306 based on the one or more screws). In some examples, electronic device 302 identifies product 306 independent of the packaging (e.g., electronic device 302 identifies a hardware product through detection of one or more pieces of hardware on a table, and/or identifies a grocery product through one or more items arranged in a refrigerator or a cabinet). In some examples, electronic device 302 identifies product 306 via a barcode and/or other scannable image (e.g., a QR code) on the packaging of product 306. In some examples, electronic device 302 can identify that a user of electronic device 302 is interested in product 306 through user interaction with product 306 in the physical environment. For example, electronic device 302 identifies that a user of electronic device 302 is interested in product 306 through the detection of attention (e.g., gaze) of the user directed to product 306 (e.g., for more than a threshold period of time, such as 0.1, 0.2, 0.5, 1, 2, 5 or 10 seconds). In some examples, electronic device 302 identifies that a user of electronic device 302 is interested in product 306 through the detection of a hand-based input (e.g., physical interaction with product 306 in physical environment using hand 308 as shown and described with reference to FIG. 3B). In some examples, electronic device 302 can identify that a user of electronic device 302 is interested in product 306 (e.g., after detecting product 306) based on a user history (e.g., a user of electronic device 302 has searched for product 306 in a web browser, includes information associated with product 306 in a file (e.g., a note of a notes application), and/or has previously purchased product 306).

In some examples, a quantity (e.g., an estimated quantity) of a product can be determined by electronic device 302. For example, while detecting product 306, electronic device 302 identifies a quantity of screws that are included within the packaging (e.g., as shown in FIG. 3A, two screws are visible in the packaging of product 306). In some examples, the electronic device 302 identifies an estimated quantity of screws within the packaging of product 306. In some examples, electronic device 302 identifies a quantity (e.g., estimated quantity) of product 306 independent of the packaging (e.g., electronic device 302 identifies a quantity of screws by detecting a quantity of screws arranged on a table). In some examples, in accordance with a quantity and/or estimated quantity of product 306 being less than a threshold amount (e.g., optionally in addition to a determination that a user of electronic device 302 is interested in product 306 as described above), electronic device 302 performs an action, such as adding information associated with product 306 to a repository of information and/or a file associated with a respective application (e.g., electronic device 302 adds product 306 to a shopping list in a notes application, such as shown and described below with reference to FIG. 3G) or presents one or more virtual elements in environment 304 associated with product 306 (e.g., as shown and described with reference to FIGS. 3D-1 to 3F). In some examples, electronic device 302 compares a detected and/or an estimated quantity of a product to a full amount of the product (e.g., electronic device 302 detects a value for a full amount of the product from the packaging of the product (e.g., a label on the packaging), retrieves information associated with the full amount of the product through a web-based object lookup, and/or retrieves information associated with the full amount of the product from a memory of electronic device 302). In some examples, the threshold amount is 2, 3, 4, 5, 10, 15, 20, 25, or 30 objects of a product that are currently detectable (e.g., via image sensors 314a-314c) in the environment 340 (e.g., product 306 and/or other products that include one or more objects within a package). For example, the threshold amount is scaled based on the product that electronic device 302 detects (e.g., if a full package of product 306 includes 30 screws, the threshold amount is an amount that is less than 30 screws (e.g., 5, 10, or 15 screws), whereas if a detected product is a package of batteries, and a full package includes 6 batteries, the threshold amount is an amount that is less than 6 batteries (e.g., 3 or 2 batteries)). Alternatively, the threshold amount is optionally a percentage (e.g., less than 1, 2, 5, 10, 15, 20, 25, 30, 35, 40, 45 or 50 percent) of a full amount of a product (e.g., corresponding to a quantity of objects within a package and/or a volume of a product within a container). For example, the product is tape, and the threshold amount corresponds to an amount of thickness of the roll of tape (e.g., the thickness of the roll of tape is detected using image sensors 314a-314c). Additionally or alternatively, in some examples, the threshold amount is a threshold sound level (e.g., in decibels) associated with a sound emitted from the product (e.g., as shown and described with reference to FIG. 3B). In some examples, electronic device 302 determines the quantity of product 306 is less than a threshold amount through one or more user inputs (e.g., an air gesture (e.g., as shown and described with reference to FIG. 3C), physical interaction with the product (e.g., as shown and described with reference to FIG. 3B), a verbal command and/or an input provided through an application that is optionally accessible through electronic device 302). For example, based on the one or more user inputs that are used by electronic device 302 to determine the quantity of product 306 is less than a threshold amount, electronic device 302 optionally determines that a user of electronic device 302 is interested in purchasing product 306. In some examples, the one or more virtual elements presented in environment 304 include information regarding a location (e.g., a business) product 306 can be purchased (e.g., as shown and described with reference to FIG. 3E).

Adding information associated with one or more products to a repository of information and/or a file associated with a respective application (e.g., adding product 306 to a shopping list) based on detecting one or more indications of interest of a user in the one or more products minimizes the amount of user input required for adding the one or more products to the repository of information and/or file (e.g., because electronic device 302 adds the information automatically in response to detecting the one or more indications of interest), thereby improving user-device interaction and conserving computing resources associated with additional user input. Adding the information associated with the one or more products to the repository of information and/or file in accordance with a determination that a quantity (and/or estimated quantity) of the one or more products is less than a threshold amount ensures that the one or more products are added to the repository of information and/or file when the one or more products need to be replenished, thereby reducing errors in user-device interaction and conserving computing resources associated with user input to correct errors.

Figure 3B:
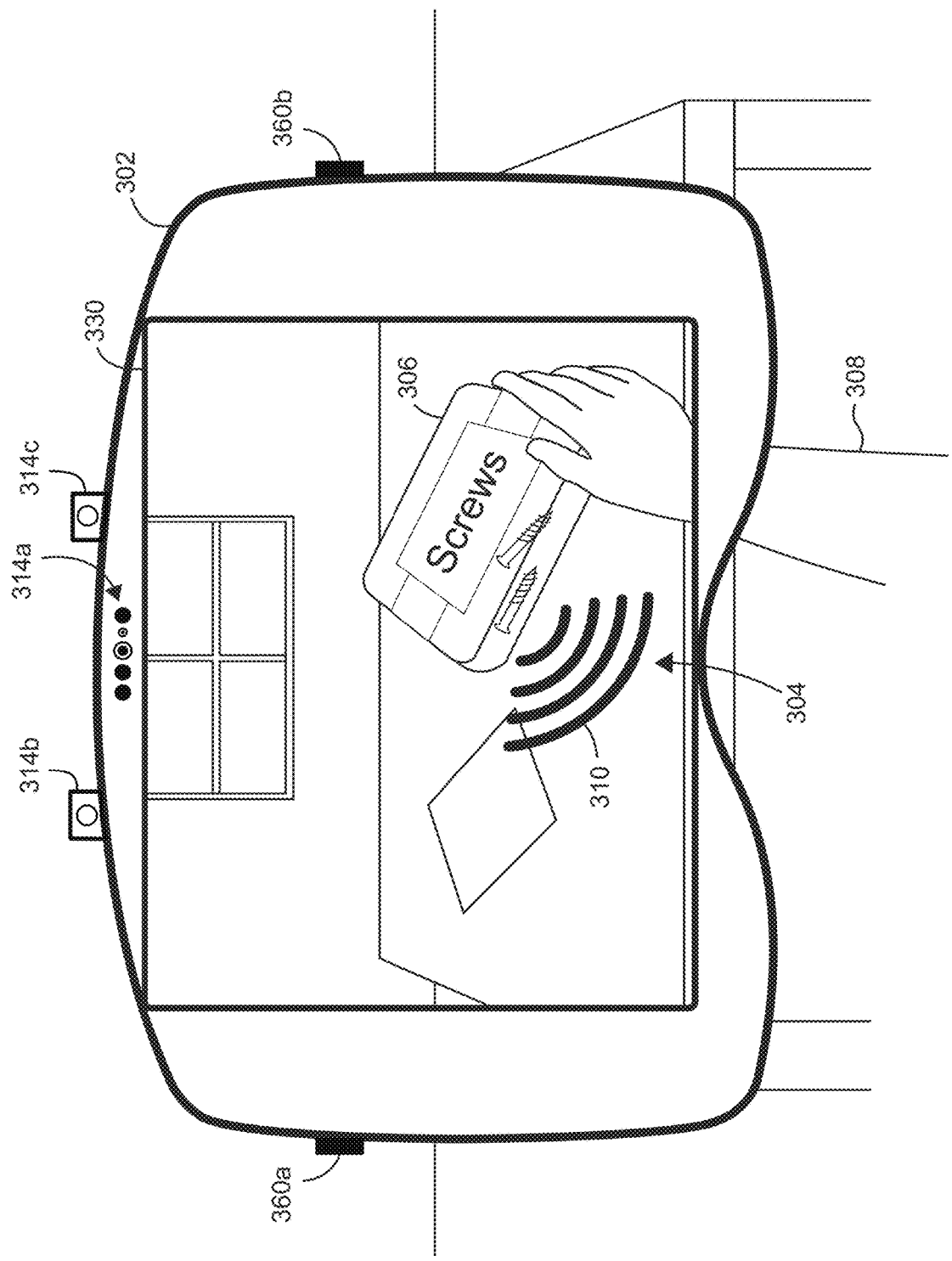

FIG. 3B illustrates electronic device 302 detecting interaction of a user of electronic device 302 with product 306 in the physical environment (e.g., the interaction of the user with product 306 in the physical environment is visible through display generation component 330). As shown in FIG. 3B, electronic device 302 detects a hand 308 of the user of electronic device 302 lift (e.g., grab, hold, and/or move) product 306. Further, the interaction of the user with product 306 causes a sound 310 to be emitted from product 306. For example, interaction with product 306 causes one or more objects (e.g., screws) within the packaging to move (e.g., the user shakes the package which causes the one or more screws to contact the interior of the package, producing sound that is detectable by electronic device 302). In some examples, electronic device 302 detects an audio input corresponding to the sound emitted from product 306 using one or more audio sensors (e.g., having one or more characteristics of microphone(s) 213 shown and described with reference to FIG. 2). In some examples, based on the detected audio input, electronic device 302 identifies that a quantity of product 306 is less than a threshold amount (e.g., electronic device 302 compares the audio input to one or more audio files (e.g., corresponding to sound prints) associated with product 306 (e.g., the one or more audio files are stored in a memory of electronic device 302 and/or retrieved from the web). In some examples, electronic device 302 detects product 306 using the audio input (e.g., in addition to using image sensors 314a-314c). In some examples, based on the interaction of the user with product 306 shown in FIG. 3B, electronic device 302 determines a quantity of objects within the package of product 306. For example, lifting and/or turning product 306 enables electronic device 302 to detect the number of screws within the package of product 306 (e.g., product 306 is viewed from a different angle and/or distance relative to electronic device 302 in FIG. 3B compared to FIG. 3A).

In some examples, electronic device 302 determines the user of electronic device 302 is interested in product 306 based on the detected user interaction with product 306 shown in FIG. 3B. For example, electronic device 302 determines whether the user of electronic device 302 intends to purchase product 306 (e.g., optionally in addition to determining that a quantity of product 306 is less than the threshold amount). In some examples, in FIG. 3B, electronic device 302 associates the detected interaction with product 306 as an indication of user interest in product 306. For example, detecting an indication of user interest in product 306 includes detecting attention (e.g., gaze) of the user of electronic device 302 directed to product 306 (e.g., for a threshold period of time (e.g., 0.1, 0.2, 0.5, 1, 2, 5 or 10 seconds)). As another example, detecting an indication of user interest in product 306 includes detecting user interaction with product 306 (e.g., corresponding to detecting lifting (e.g., for a threshold period of time (e.g., 0.1, 0.2, 0.5, 1, 2, 5 or 10 seconds)), rotating, turning, twisting, shaking and/or moving product 306). In some examples, detecting an indication of user interest in product 306 includes detecting an air gesture performed by a user (e.g., as shown and described with reference to FIG. 3C). In some examples, in response to detecting an indication of user interest in product 306 (e.g., detecting user interaction with product 306, such as gaze and/or a hand-based input), electronic device 302 stores information associated with product 306 (e.g., in a file of an application).

Figure 3C:
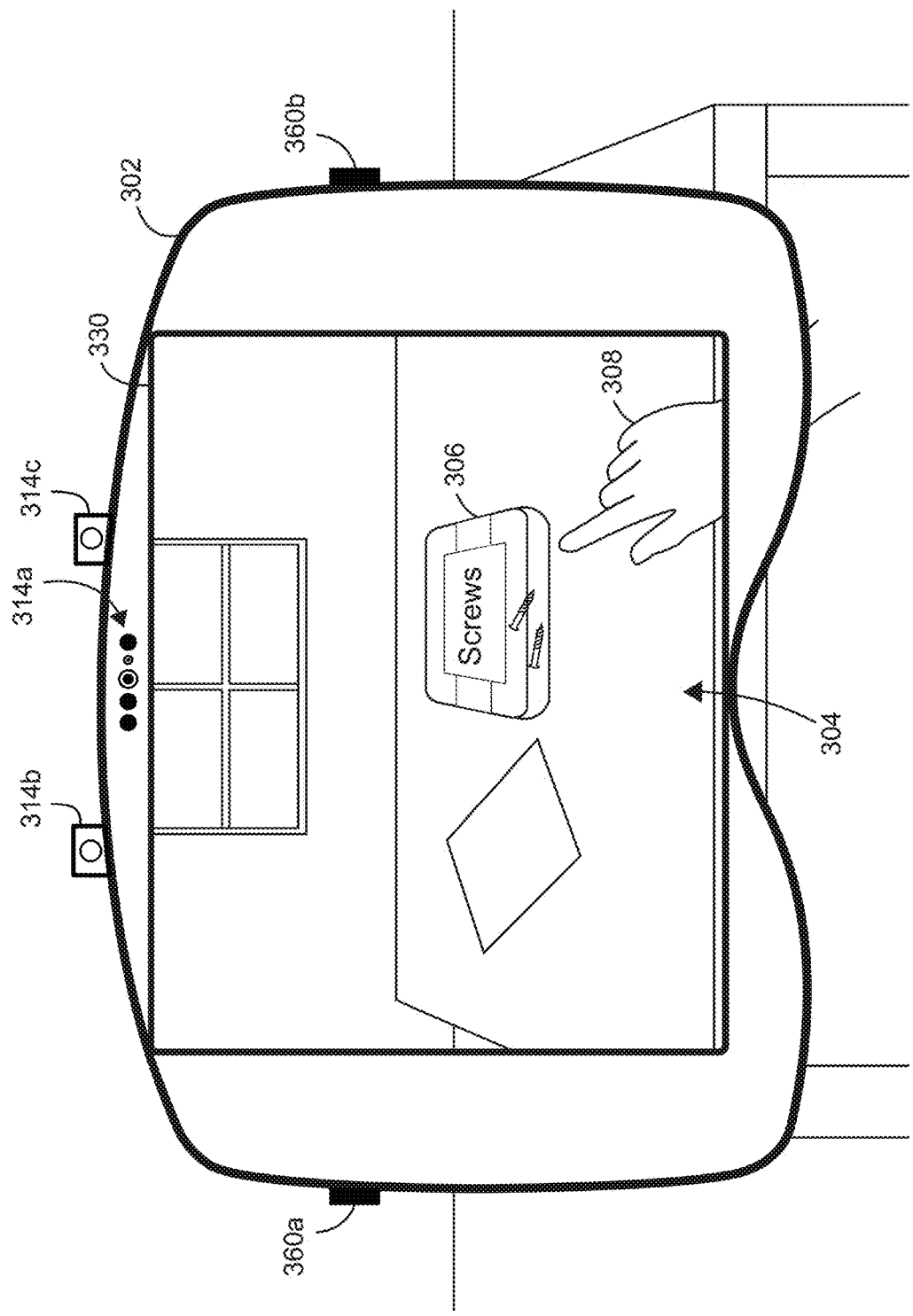

FIG. 3C illustrates the user of electronic device 302 performing an air gesture using hand 308. In some examples, the air gesture is detected as being directed to product 306. In some examples, the air gesture corresponds to an indication of user interest in product 306. In some examples, the air gesture corresponds to a pre-defined (e.g., through one or more system settings and/or one or more user settings) gesture for indicating that the user of electronic device 302 is interested in purchasing product 306 and/or for indicating that a quantity of product 306 is less than a threshold amount. In some examples, in response to detecting the air gesture shown in FIG. 3C (e.g., and optionally based on a separate determination that the quantity of product 306 is less than the threshold amount), electronic device 302 presents the one or more virtual elements in environment 304 (e.g., as shown and described with reference to FIGS. 3D-1 to 3F). In some examples, in response to detecting the air gesture shown in FIG. 3C, electronic device 302 stores information associated with product 306 (e.g., in a repository of information and/or a file of an application). As shown in FIG. 3C, the air gesture performed using hand 308 corresponds to a pointing gesture directed toward product 306. It should be appreciated that, in some examples, the air gesture can include different gestures from what is shown in FIG. 3C (e.g., an air tap, air pinch, an air long pinch (e.g., a pinch for a threshold period of time, such as 0.1, 0.2, 0.5, 1, 2, 5, or 10 seconds) an air drag (e.g., proximal motion of the hand while performing a gesture with one or more fingers, such as a pinch), a snap of two fingers, a hand wave and/or a knock on a real-world surface). For example, the type of air gesture is customized by the user of electronic device 302 (e.g., and associated with one or more settings of a user profile).

In some examples, electronic device 302 presents one or more virtual elements in environment 304 associated with product 306 in response to one or more criteria being satisfied. For example, the one or more criteria include a criterion that is satisfied when electronic device 302 determines the quantity of product 306 is less than the threshold amount (e.g., as described above). For example, the one or more criteria include a criterion that is satisfied when electronic device 302 detects interaction (e.g., physical interaction) of the user of electronic device 302 with product 306 (e.g., as described above). For example, the one or more criteria include a criterion that is satisfied when electronic device 302 detects one or more indications of user interest in product (e.g., as described above). In some examples, in response to the one or more criteria being satisfied, electronic device 302 stores information associated with product 306 (e.g., in a file of an application (e.g., as shown and described with reference to FIG. 3G)). For example, in response to the one or more criteria being satisfied, electronic device 302 adds (e.g., automatically (e.g., without additional user input) product 306 to a shopping list (e.g., associated with a notes application, as shown in FIG. 3G)). Presenting the one or more virtual elements in environment 304 associated with product 306 in response to the one or more criteria being satisfied enables electronic device 302 to present the one or more virtual elements when the user of electronic device 302 intends for the one or more virtual elements to be presented (e.g., because the user is interested in product 306 and/or product 306 has a quantity that is estimated to be less than a threshold amount), thereby improving user-device interaction and conserving computing resources.

Figures 1, 3D:
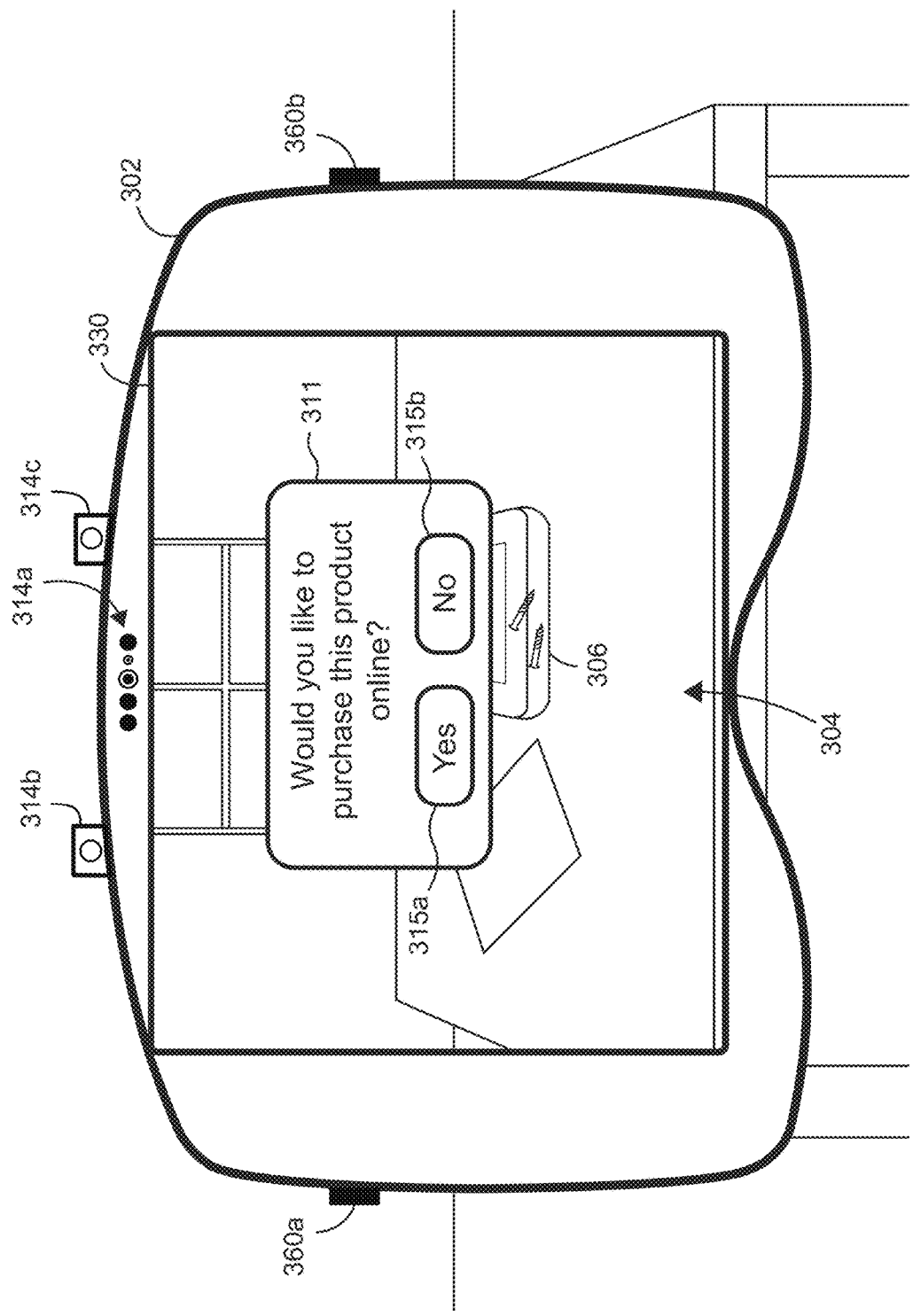
Figures 2, 3D:
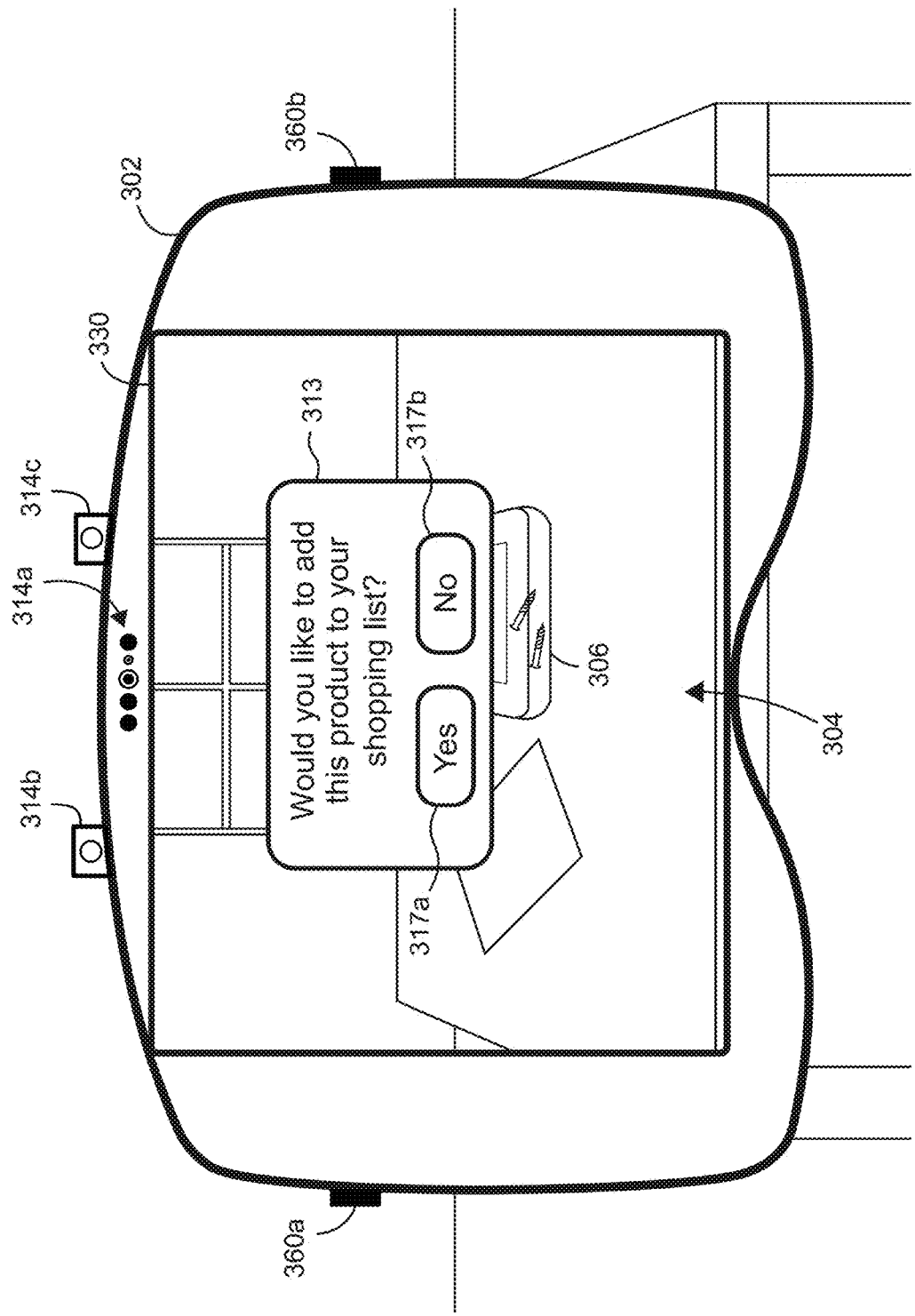

FIG. 3D-1 illustrates electronic device 302 presenting a virtual element 311 in environment 304 in response to the one or more criteria being satisfied. For example, electronic device 302 presents virtual element 311 in environment 304 in response to detecting attention (e.g., gaze) of the user being directed to product 306 (e.g., for a threshold period of time (e.g., 0.1, 0.2, 0.5, 1, 2, 5 or 10 seconds)). For example, electronic device 302 presents virtual element 311 in environment 304 in response to detecting physical interaction with product 306 (e.g., as shown and described with reference to FIG. 3B) and/or in response to detecting an air gesture (e.g., as shown and described with reference to FIG. 3C). In some examples, virtual element 311 includes a first selectable option 315a that is selectable to initiate a process for purchasing product 306 online (e.g., through an electronic commerce website or application). For example, in response to detecting selection of first selectable option 315a, electronic device 302 orders product 306 from an online vendor (e.g., from a vendor that is preferred by the user based on one or more settings associated with a user profile, and/or using a payment method that is preferred by the user based on one or more settings associated with a user profile) automatically (e.g., without additional user input). For example, in response to detecting selection of first selectable option 315a, electronic device 302 presents a list of online vendors from whom product 306 may be purchased (e.g., similar to the list of selectable options shown within virtual element 312 in FIG. 3E). In some examples, second selectable option 315b is selectable to cease presentation of virtual element 311 in environment 304 (e.g., and to forgo purchasing product 306 online). In some examples, first selectable option 315a and/or second selectable option 315b are selectable through a user input having one or more characteristics of the user input shown and described with reference to FIG. 3D-3.

Alternatively, in some examples, electronic device 302 automatically purchases product 306 (e.g., through an online vendor) in response to the one or more criteria being satisfied (e.g., without additional user input and/or without presenting virtual element 311). For example, the user of electronic device 302 opts in and/or authorizes electronic device 302 (e.g., through an application (e.g., an electronic commerce application) and/or a digital payment service) to automatically order one or more products (e.g., product 306) that electronic device 302 detects as having a quantity and/or an estimated quantity that is less than a threshold amount (e.g., the threshold amount described above).

FIG. 3D-2 illustrates electronic device 302 presenting a virtual element 313 in environment 304 in response to the one or more criteria being satisfied. For example, electronic device 302 presents virtual element 313 in environment 304 in response to detecting attention (e.g., gaze) of the user being directed to product 306 (e.g., for a threshold period of time (e.g., 0.1, 0.2, 0.5, 1, 2, 5 or 10 seconds)). For example, electronic device 302 presents virtual element 313 in environment 304 in response to detecting physical interaction with product 306 (e.g., as shown and described with reference to FIG. 3B) and/or in response to detecting an air gesture (e.g., as shown and described with reference to FIG. 3C). In some examples, virtual element 313 includes a first selectable option 317a that is selectable to store information associated with product 306 (e.g., in a repository of information associated with a respective application and/or in a file of a respective application). For example, in response to detecting selection of first selectable option 317a, electronic device 302 adds product 306 to a shopping list (e.g., similar to the shopping list included in user interface 328 shown and described with reference to FIG. 3G). The shopping list is optionally not store specific (e.g., the shopping list includes a list of products that may be purchased at different stores). For example, in response to detecting that electronic device 302 (e.g., and a user wearing electronic device 302) is within a proximity (e.g., a threshold distance) of a store and/or business from which a product on the shopping list (e.g., product 306) may be purchased, electronic device 302 presents, via display generation component 330, a virtual element corresponding to a notification (e.g., as shown and described with reference to FIG. 3H and/or FIG. 3I). In some examples, second selectable option 317b is selectable to cease presentation of virtual element 313 in environment 304 (e.g., and to forgo storing information associated with product 306). In some examples, first selectable option 317a and/or second selectable option 317b are selectable through a user input having one or more characteristics of the user input shown and described with reference to FIG. 3D-3. Alternatively, in some examples, electronic device 302 automatically stores information associated with product 306 (e.g., in a file of an application, such as on a file associated with a shopping list) in response to the one or more criteria being satisfied (e.g., without presenting virtual element 313).

Figures 3, 3D:
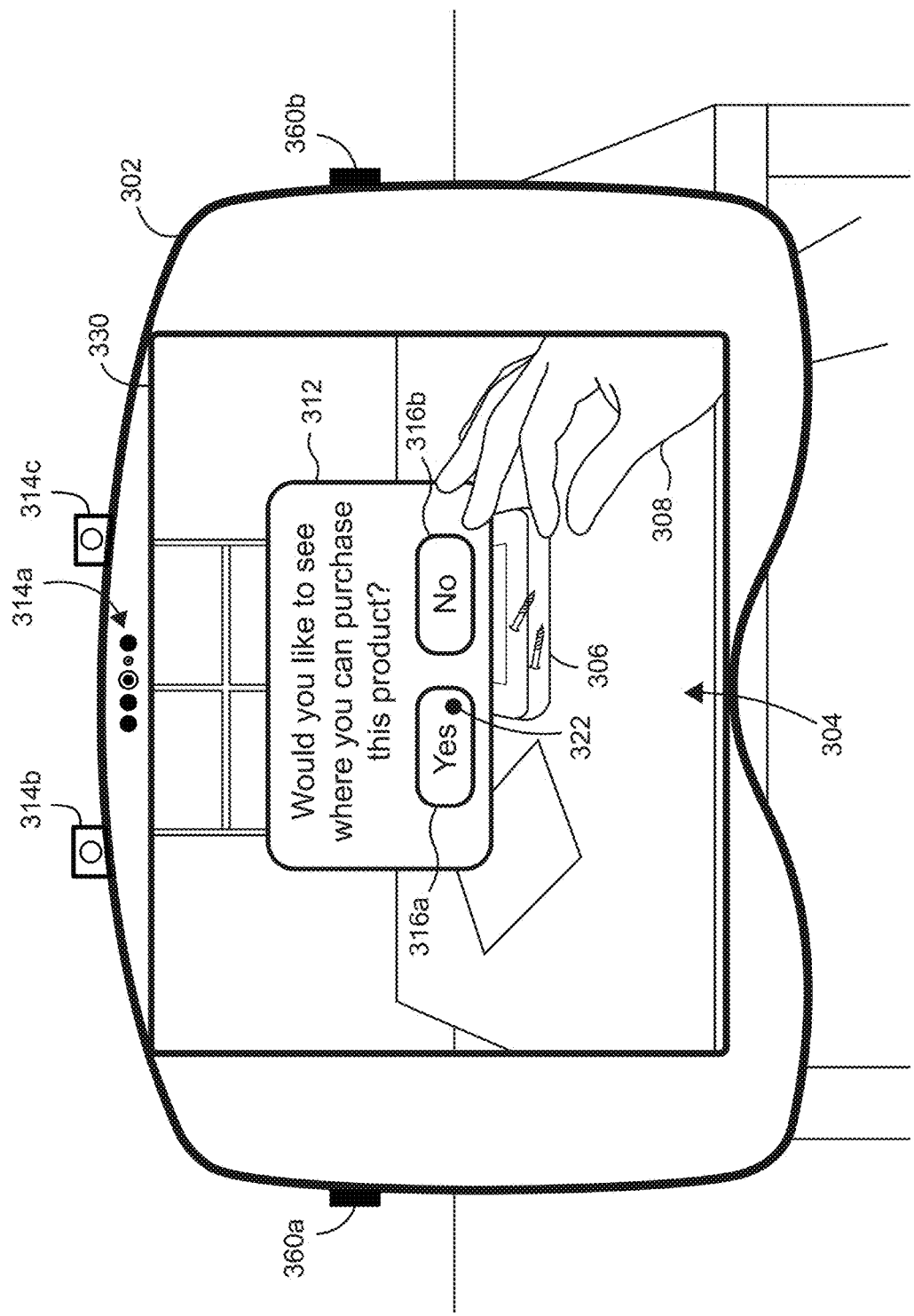

FIG. 3D-3 illustrates electronic device 302 presenting a virtual element 312 in environment 304 in response to the one or more criteria being satisfied. For example, electronic device 302 presents virtual element 312 in environment 304 in response to detecting attention (e.g., gaze) of the user being directed to product 306 (e.g., for a threshold period of time (e.g., 0.1, 0.2, 0.5, 1, 2, 5 or 10 seconds)). For example, electronic device 302 presents virtual element 312 in environment 304 in response to detecting physical interaction with product 306 (e.g., as shown and described with reference to FIG. 3B) and/or in response to detecting an air gesture (e.g., as shown and described with reference to FIG. 3C). In some examples, virtual element 312 includes options that are selectable by the user of electronic device 302 for presenting one or more regions (e.g., stores/businesses) where product 306 can be purchased in environment 304. For example, as shown in FIG. 3D-3, virtual element 312 includes a first selectable option 316a and a second selectable option 316b. In some examples, first selectable option 316a is selectable to present one or more virtual elements in environment 304 that include one or more regions (e.g., stores/businesses) where product 306 can be purchased. In some examples, second selectable option 316b is selectable to cease presentation of virtual element 312 in environment 304 (e.g., second selectable option 316b is selectable to forgo presentation of the one or more virtual elements in environment 304 that include one or more regions (e.g., stores/businesses) where product 306 can be purchased). Presenting virtual element 312 in environment 304 provides a user of electronic device 302 an opportunity to confirm that their intent is for electronic device 302 to present the one or more virtual elements in environment 304, thereby conserving computing resources by preventing the presentation of virtual elements that a user is not interested in. In some examples, virtual element 312 is optionally displayed via a display component (e.g., optionally different from display generation component 330) in communication with electronic device 302. For example, in response to the one or more criteria being satisfied (e.g., electronic device 302 determines the one or more criteria are satisfied through one or more inputs detected using one or more image sensors), virtual element 312 is displayed on a display of a device (e.g., a mobile phone, tablet, laptop and/or smart watch) in communication with electronic device 302. In some examples, the user of electronic device 302 interacts with virtual element through the device (e.g., through a touch-sensitive display of the device) in communication with electronic device 302.

In some examples, first selectable option 316a and/or second selectable option 316b are selectable through user input. For example, as shown in FIG. 3D-3, the user of electronic device 302 provides an input corresponding to selection of first selectable option 316a (e.g., corresponding to a request to present the one or more virtual elements in environment 304 that include information regarding where product 306 can be purchased). In some examples, as shown in FIG. 3D-3, the user input includes gaze 322 (e.g., represented by a circle in FIG. 3D-3) being directed to first selectable option 316a. In some examples, as shown in FIG. 3D-3, the user input includes an air gesture (e.g., an air pinch) performed using hand 308. In some examples, the user input can alternatively include an audio input (e.g., a verbal command), an input provided through a hardware device (e.g., hardware button 360a and/or hardware button 360b), a launch of an application (e.g., associated with presenting locations where products can be purchased), and/or an input provided through a touch-sensitive surface.

Figure 3E:
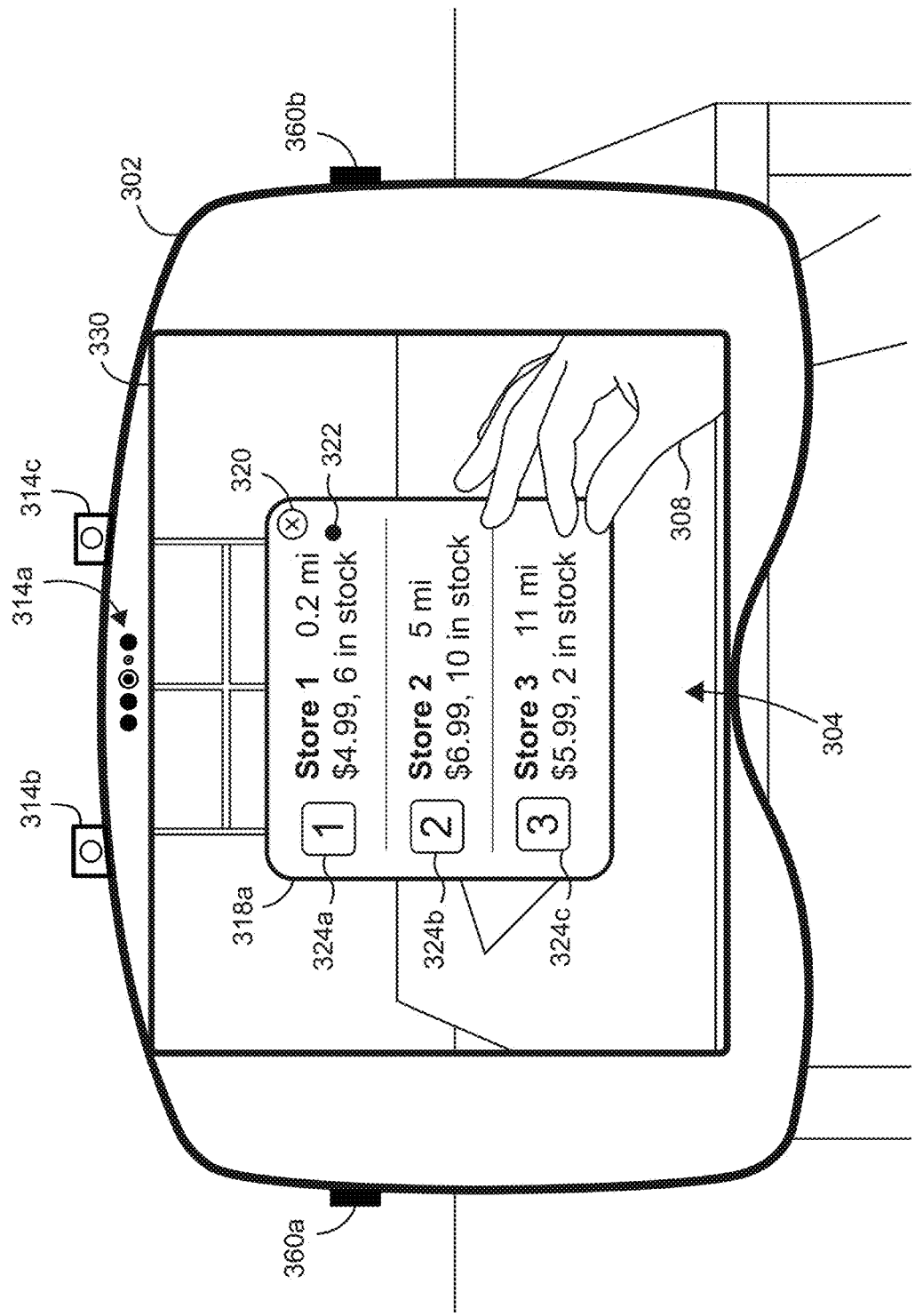
Figure 3G:
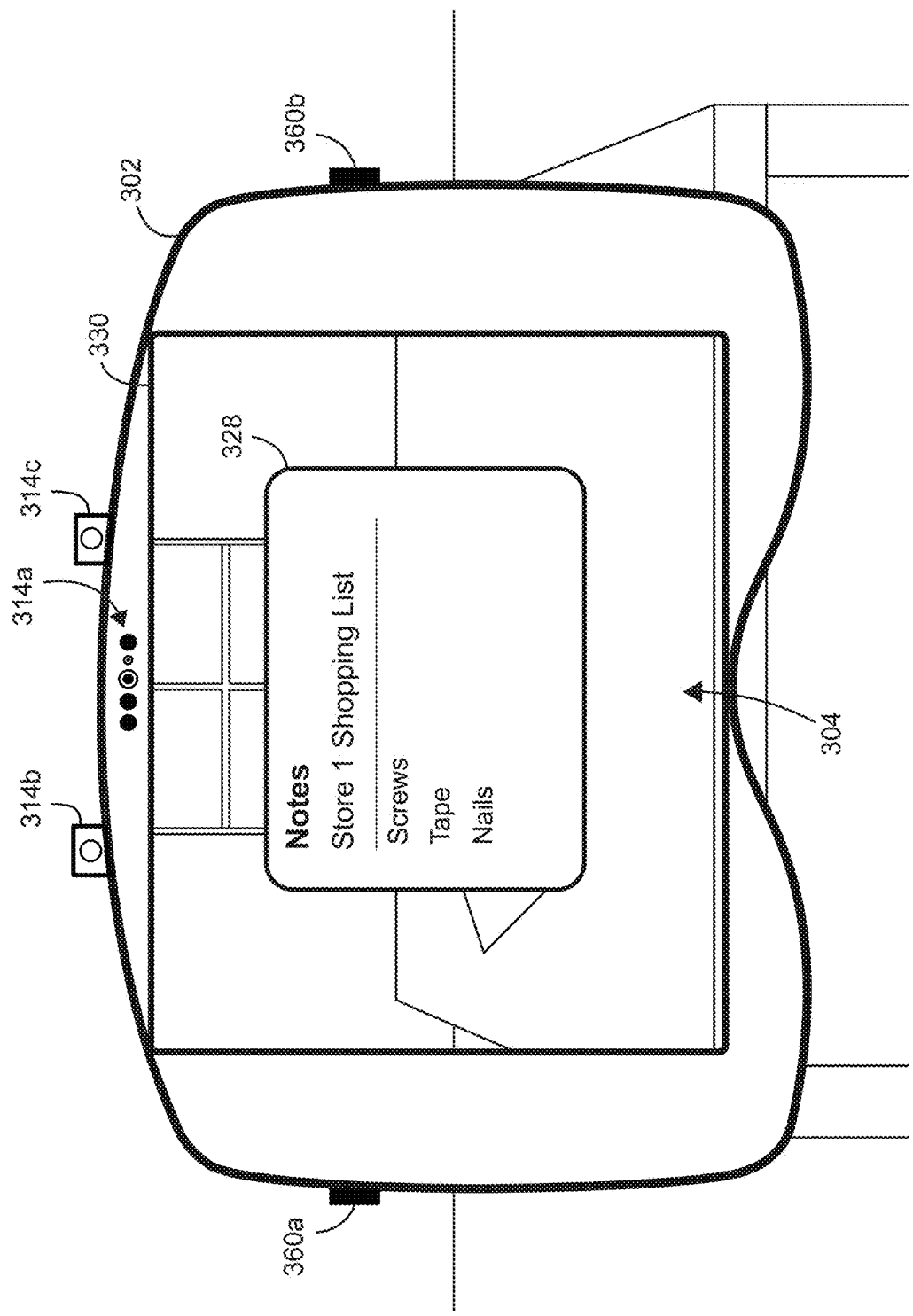

In some examples, in response to the one or more criteria being satisfied (e.g., in response to detecting a quantity of product 306 and/or one or more indications of user interest in product 306), electronic device 302 presents a virtual element in environment 304 including one or more regions (e.g., corresponding to one or more stores and/or businesses) in the physical environment where product 306 can be purchased (e.g., virtual element 318a shown and described with reference to FIG. 3E). Particularly, in some examples, electronic device 302 presents the virtual element including the one or more regions where product 306 can be purchased without presenting virtual element 312 environment 304. For example, in response to detecting that a quantity of product 306 is below the threshold amount and/or one or more indications of user interest in product 306, electronic device 302 automatically presents the virtual element (e.g., discussed below) in environment 304 including one or more regions where product 306 can be purchased. In some examples, in response to the one or more criteria being satisfied, electronic device 302 stores information associated with product 306 (e.g., in a repository of information associated with a respective application and/or in a file of a respective application) without presenting one or more virtual elements (e.g., without presenting virtual element 312). Automatically presenting the virtual element including the one or more regions where product 306 can be purchased in environment 304 and/or storing the information associated with product 306 without presenting a qualifying virtual element (e.g., virtual element 312) in environment 304 minimizes the presentation of unnecessary virtual objects in environment 304 and conserves computing resources.

FIG. 3E illustrates electronic device 302 presenting a virtual element 318a in environment 304 including one or more visual indications of one or more regions (e.g., stores/businesses) where product 306 can be purchased (e.g., in response to the one or more criteria being satisfied). As shown in FIG. 3E, virtual element 318 includes visual indications of a first region 324a, a second region 324b and a third region 324c. For example, first region 324a, second region 324b and third region 324c correspond to stores/businesses where product 306 can be purchased. In some examples, electronic device 302 presents the one or more regions in an order based on a proximity of the one or more regions to a location of electronic device 302 (e.g., a location that is closest in proximity to electronic device 302 is the first region (e.g., at the top of the list of stores/businesses) included/listed in virtual element 318a. Additionally, the one or more regions included in virtual element 318a are optionally within a threshold distance (e.g., 0.5, 1, 2, 5, 10, 15, 20, 25, 30, 35, 40, 45 or 50 miles) of electronic device 302. In some examples, electronic device 302 orders the one or more regions based on a known user history (e.g., first region 324a, second region 324b and/or third region 324c correspond to stores/businesses that a user of electronic device 302 has previously visited and/or previously searched for) according to user data provided by an application (e.g., web-browsing application, navigation application, and/or a shopping application). In some examples, electronic device 302 orders the one or more regions based on a user preference (e.g., electronic device 302 detects that the user frequents one or more stores/businesses, and/or the one or more stores/businesses are defined as preferred stores/businesses in a user profile (e.g., set by the user)). In some examples, virtual element 318a is presented with one region corresponding to where the user of electronic device 302 can purchase product 306 (e.g., the one region is the most preferred store/business of the user, or the store/business that is at the closest distance to electronic device 302). In some examples, the user of electronic device 302 can interact with virtual element 318*a* to view alternate regions (e.g., through user input such as a selection of a selectable option included in virtual element 318*a* (e.g., causing an expansion of a list of regions and/or a view of a new page of a list of regions) or a scroll of the virtual element 318*a* (e.g., causing display of additional regions), an audio input (e.g., a verbal command), an input provided through a hardware device (e.g., hardware button 360*a* and/or 360*b*) and/or an input provided through a touch-sensitive surface). Including one or more regions where product 306 can be purchased within virtual element 318*a* based on proximity and/or previous user interaction limits the number of regions presented by electronic device 302 to those that the user of electronic device 302 is likely to be interested in, thereby improving user-device interaction and conserving computing resources.

As shown in FIG. 3E, virtual element 318*a* includes information associated with the one or more regions where product 306 can be purchased. For example, as shown in FIG. 3E, first region 324*a*, second region 324*b* and third region 324*c* are presented with indications of a name (e.g., store name), current distance from electronic device 302, a logo (e.g., of the store brand), a price of product 306, and a quantity (e.g., current stock) of product 306 in-store. In some examples, the one or more region are presented with additional information (e.g., or optionally less information) associated with product 306, such as a name and/or brand of the product, specifications of the product (e.g., size, material, type, and/or color), and/or a location of the product within each region (e.g., aisle and/or shelf number). Further, as shown in FIG. 3E, a virtual affordance 320 is shown. In some examples, virtual affordance 320 is selectable to cease presentation of virtual element 318*a* in environment 304 (e.g., through a user input having one or more characteristics of the selection of first region 324*a*). In some examples, electronic device 302 ceases to present virtual element 318*a* after a user of electronic device 302 does not interact with virtual element 318*a* for a threshold period of time (e.g., 0.1, 0.2, 0.5, 1, 2, 3, 4, 5 or 10 minutes). In some examples, electronic device 302 ceases to present virtual element 318*a* in response to detecting an air gesture, verbal input, hardware device input and/or an input provided through a touch-sensitive surface.

In some examples, the one or more regions are selectable through user input to cause the electronic device 302 to perform an operation associated with the one or more regions. For example, as shown in FIG. 3E, the user of electronic device 302 provides an input corresponding to a selection of first region 324*a*. In some examples, the input includes attention (e.g., gaze 322) directed to first region 324*a* and/or an air gesture (e.g., an air pinch) performed by hand 308. In some examples, in response to detecting an input corresponding to selection of a particular region, electronic device 302 stores information associated with product 306 and/or the region where product 306 can be purchased (e.g., in a file of an application as shown and described with reference to FIG. 3G). For example, product 306 is added to a shopping list for a store associated with first region 324*a*.

FIG. 3F illustrates electronic device 302 presenting a virtual element 318*b* in environment 304 in response to the input provided by the user of electronic device 302 in FIG. 3E. Particularly, in response to the input corresponding to the selection of first region 324*a* shown in FIG. 3E, electronic device 302 presents virtual element 318*b* in environment 304 to provide the user of electronic device 302 an opportunity to confirm whether electronic device 302 should store information associated with product 306 and/or first region 324*a*. For example, as shown in FIG. 3F, virtual element 318*b* includes a first selectable option 326*a* and a second selectable option 326*b*. In some examples, first selectable option 326*a* is selectable to store the information associated with product 306 and/or first region 324*a*. In some examples, second selectable option 326*b* is selectable to forgo storing the information associated with product 306 and/or first region 324*a*. In some examples, first selectable option 326*a* and second selectable option 326*b* are selectable through user input (e.g., having one or more characteristics of the user input for selecting first selectable option 316*a* and/or second selectable option 316*b* as shown and described with reference to FIG. 3D-3). In some examples, in response to selection of second selectable option 326*b*, electronic device 302 ceases to present virtual element 318*b* in environment 304 (e.g., and optionally ceases to present virtual element 318*a* in environment 304). In some examples, while ceasing to present virtual element 318*b* in environment 304 in response to an input corresponding to selection of second selectable option 326*b*, electronic device 302 maintains presentation of virtual element 318*a* (e.g., such that the user of electronic device 302 can select a different region of the one or more regions where product 306 can be purchased).

As shown in FIG. 3F, the user of electronic device 302 provides an input corresponding to selection of first selectable option 326*a* (e.g., the input includes gaze 322 directed to first selectable option 326*a* while an air gesture is optionally performed using hand 308). In some examples, in response to the selection of first selectable option 326*a*, electronic device 302 adds information associated with product 306 and first region 324*a* to a repository of information. For example, electronic device 302 stores information associated with intent of the user of electronic device 302 to purchase product 306 at the store associated with first region 324*a* in a memory at a first time period. At a second time period, after the first time period, electronic device 302 determines that a location of electronic device 302 corresponds to first region 324*a* and presents one or more virtual elements in environment 304 associated with product 306 (e.g., the one or more virtual elements navigate the user of electronic device 302 to a location of product 306 within a store and/or facilitate the purchase of product 306, as shown and described with reference to FIGS. 4A-4K). In some examples, the repository of information is associated with an application. For example, the application is accessible by the user of electronic device 302 (e.g., using electronic device 302) and includes a user interface for viewing the information associated with product 306 and first region 324*a*. For example, the application is associated with tracking shopping lists (e.g., electronic device 302 adds product 306 to a shopping list (e.g., a file of the application) that is accessible to the user of electronic device 302). For example, the application is associated with a note-taking application (e.g., electronic device 302 creates a note (e.g., a file of the application) that includes a shopping list and/or adds product 306 to an existing note that includes a shopping list (e.g., the shopping list is for the store associated with first region 324*a*)). In some examples, in response to the selection of first region 324*a* shown and described with reference to FIG. 3E, electronic device 302 automatically adds the information associated with product 306 and first region 324*a* to the repository of information. For example, electronic device 302 does not present virtual element 318b in environment 304 after receiving the input corresponding to selection of first region 324a and/or prior to adding the information associated with product 306 and first region 324a to the repository of information. Automatically storing the information associated with product 306 in a repository of information without presenting a qualifying virtual element (e.g., virtual element 318b) in environment 304 minimizes the presentation of virtual objects in environment 304 and conserves computing resources.

FIG. 3G illustrates electronic device 302 presenting a user interface 328 of an application in environment 304. In some examples, user interface 328 is associated with an application including the repository of information that electronic device 302 added the information associated with product 306 and first region 324a to. For example, electronic device 302 adds the information associated with product 306 and first region 324a to the repository of information (e.g., in response to the input provided by the user of electronic device 302 shown in FIG. 3F), and the information associated with product 306 and first region 324a is accessible to the user of electronic device 302 through user interface 328. Adding the information associated with product 306 and first region 324a to a user interface that is accessible by the user of electronic device 302 provides the user an opportunity to revise the information (e.g., including removing the information if the user has already purchased the product and/or editing the information to include a different location associated with a different store). In some examples, user interface 328 is displayed via a display component (e.g., optionally different from display generation component 330) in communication with electronic device 302. For example, user interface 328 is accessed via a device in communication with electronic device 302 (e.g., a mobile phone, tablet, laptop and/or smart watch). In some examples, the user of electronic device 302 interacts with user interface 328 through the device in communication with electronic device 302 (e.g., through a touch-sensitive display of the device).

As shown in FIG. 3G, user interface 328 is associated with a notes application that includes a shopping list. For example, the shopping list includes a list of products that can be purchased at a store associated with first region 324a in FIG. 3E. The shopping list optionally includes one or more products in addition to product 306 (and optionally different from product 306). For example, as shown in FIG. 3G, the shopping list included in user interface 328 includes tape and nails. In some examples, the one or more products different from product 306 correspond to one or more products that electronic device 302 detects and/or determines to have a quantity that is less than a threshold amount. In some examples, prior to adding the one or more products different from product 306 to the shopping list included in user interface 328, electronic device 302 detects one or more indications of user interest in (e.g., purchasing) the one or more products. In some examples, electronic device 302 automatically adds the one or more products to the shopping list included in user interface 328 (e.g., in response to the one or more criteria being satisfied). In some examples, the user of electronic device 302 adds the one or more products to user interface 328 (e.g., through one or more user inputs, such as an audio input (e.g., verbal command), an input provided through a virtual input element (e.g., a virtual keyboard), and/or an input provided through a touch-sensitive surface). Alternatively, in some examples, the shopping list included in user interface 328 is not associated with one or more regions (e.g., stores or businesses). For example, in accordance with a determination that the one or more criteria are satisfied (e.g., as described above), electronic device 302 adds (e.g., automatically (e.g., without additional user input)) product 306 to a shopping list (e.g., electronic device 302 adds product 306 to the shopping list without presenting one or more of the virtual elements shown in FIGS. 3D-1 to 3F). For example, the shopping list can be used to purchase products at different stores or businesses (e.g., and is not limited to products found in a particular store). Additionally, or alternatively, in some examples, the products included in the shopping list are not limited to a particular brand or type (e.g., the shopping list can be used to purchase different brands of the products (e.g., different brands of screws, tape, or nails)).

In some examples, in response to selection of first region 324a (e.g., as shown and described with reference to FIGS. 3E-3F), a navigation application (e.g., that is accessible via electronic device and/or through a device in communication with electronic device) retrieves and/or provides directions to first region 324a. In some examples, in response to selection of first region 324a, information (e.g., an address and/or coordinates) associated with first region 324a is stored in the navigation application. For example, in response to launching the navigation application (e.g., on electronic device 302 and/or on a device in communication with electronic device 302), first region 324a is presented as a suggested location for the user to navigate to. In some examples, information associated with first region 324a is stored in the navigation application in response to the creation of a shopping list associated with first region 324a (e.g., as shown in user interface 328 in FIG. 3G).

Figure 3H:
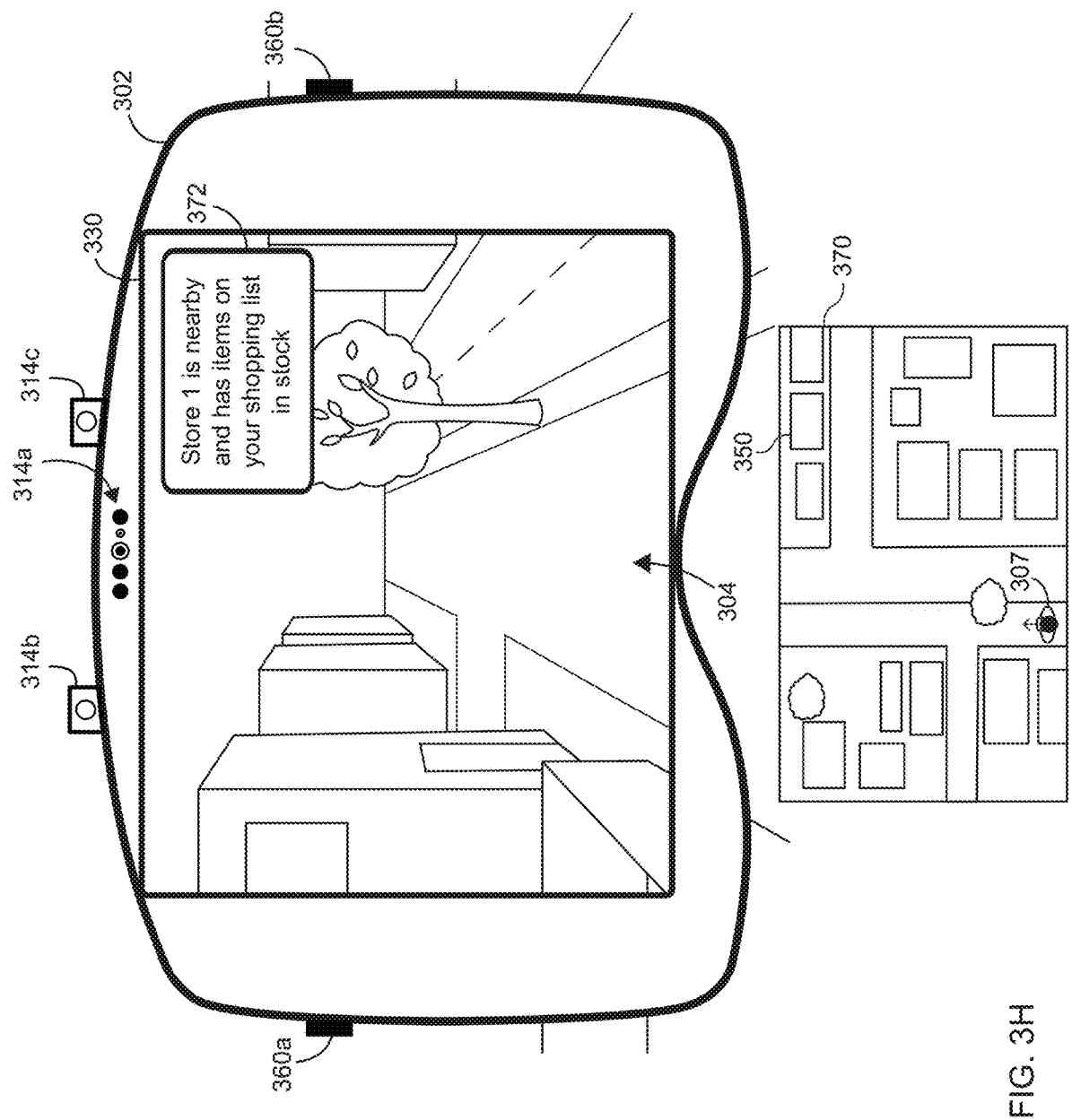

FIG. 3H illustrates electronic device 302 presenting, via display generation component 330, a virtual element 372 indicating that one or more products of interest to a user 307 are available for purchase within a region (e.g., at a store and/or business) of the physical environment. As shown in FIG. 3H, virtual element 372 indicates to user 307 (e.g., shown in overhead view 370) of electronic device 302 (e.g., user 307 is wearing electronic device 302) that one or more products stored on a shopping list (e.g., electronic device 302 added information associated with the one or more products to a repository of information, as described above) are available for purchase from a nearby store 350 (e.g., store 350 corresponds to a region of the physical environment, as described above with reference to FIGS. 3E-3F).

In some examples, in FIG. 3H, electronic device 302 presents virtual element 372 in accordance with a determination that one or more second criteria are satisfied. For example, the one or more criteria include a criterion that is satisfied when one or more products were previously stored by electronic device 302 in a shopping list. For example, the one or more criteria include a criterion that is satisfied when a respective region of the physical environment (e.g., store 350) has one or more products from a shopping list available for purchase and the respective region is within a threshold distance (e.g., 0.1, 0.2, 0.5, 1, 2, 5, or 10 kilometers) of a current location of electronic device 302 (e.g., and/or user 307). For example, the one or more criteria include a criterion that is satisfied when electronic device 302 (e.g., and/or user 307) moves away from a respective location of the physical environment (e.g., electronic device 302 and/or user 307 move away from a location corresponding to a home of user 307 (e.g., the location corresponding to the home of user 307 is stored in a user profile), and/or electronic device 302 and/or user 307 move away from an initial location at which the one or more products were added to the shopping list). For example, the one or more criteria include a criterion that is satisfied when user 307 initiates transportation or changes the current mode of transportation (e.g., as detected by orientation sensor(s) 210 (e.g., motion sensors and/or one or more gyroscopes and/or one or more accelerometers) and/or location sensor(s) 204) (e.g., electronic device 302 detects movement of user 307 and/or electronic device 302 via a vehicle (e.g., an automobile)). For example, the one or more criteria include a criterion that is satisfied when user 307 is navigating on a route using a navigation application (e.g., as described above), and a respective region of the physical environment (e.g., store 350) that is on the route has one or more products from a shopping list available for purchase. For example, the one or more criteria include a criterion that is satisfied when electronic device 302 detects an indication that user 307 is interested in shopping (e.g., user 307 previously created a calendar event associated with shopping (e.g., grocery shopping), and/or a current time of the day and/or week corresponds to a time that user 307 has previously performed errands such as shopping). For example, the one or more criteria include a criterion that is satisfied in accordance with a determination that user 307 has no existing events and/or obligations during a period of time (e.g., a calendar indicates that user 307 does not have an existing event scheduled for 1, 2, 6, 12, or 24 hours).

Figure 3I:
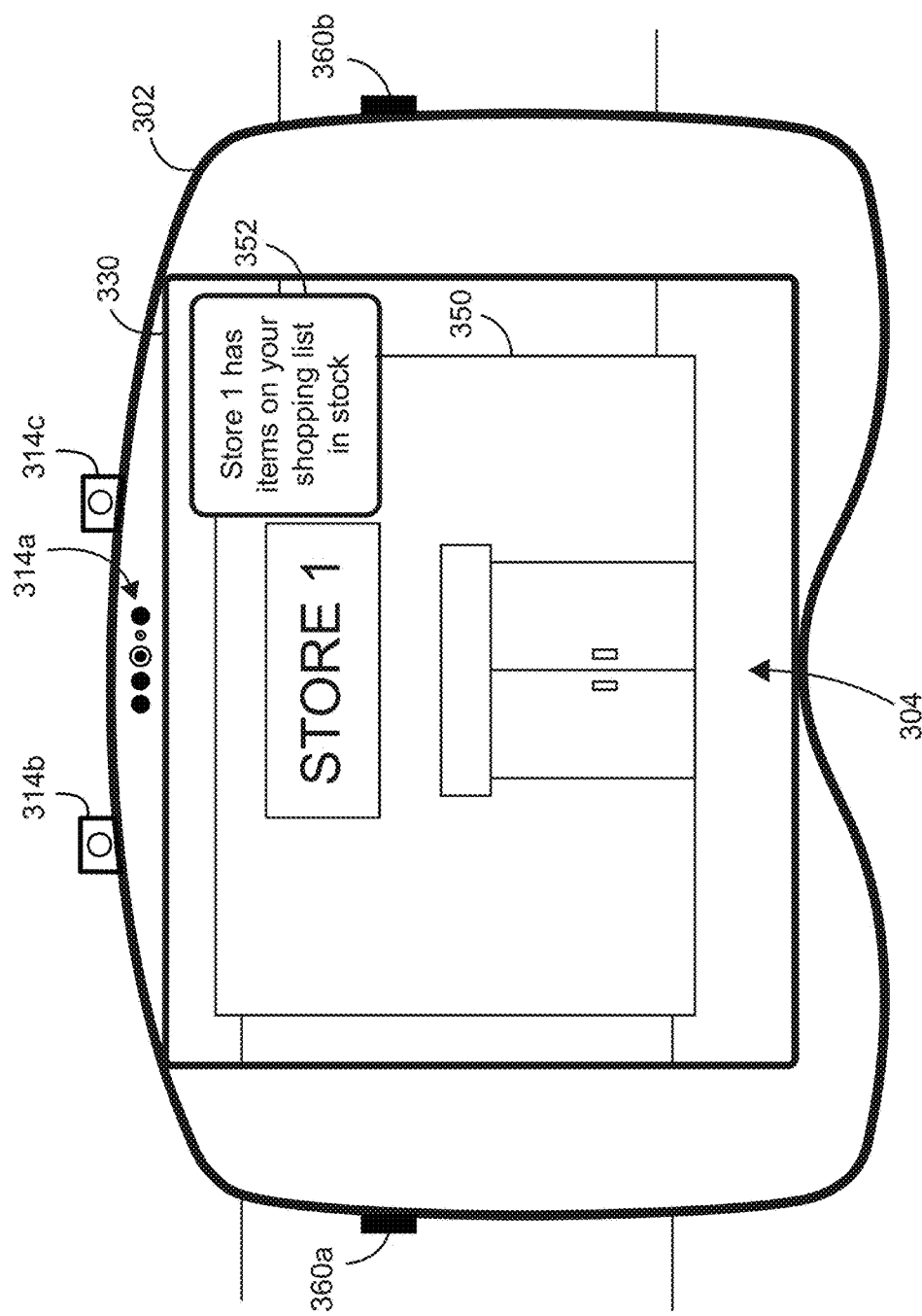

FIG. 3I illustrates electronic device 302 presenting, via display generation component 330, a virtual element 352 indicating that one or more products of interest to a user of electronic device 302 (e.g., user 307 shown in FIG. 3H) are available for purchase within a region (e.g., a store and/or business) of the physical environment. As shown in FIG. 3I, virtual element 352 indicates that one or more products stored on a shopping list (e.g., as described above) are available for purchase at store 350. For example, electronic device 302 presents virtual element 352 in accordance with a determination that a respective region of the physical environment (e.g., store 350) that has one or more products from a stored shopping list available for purchase is within a current field of view of electronic device 302 (e.g., and/or the user of electronic device 302).

FIGS. 4A-4K illustrate an exemplary method for presenting one or more virtual elements associated with one or more products in an environment based on a location of an electronic device, according to some examples of the disclosure. For example, the one or more virtual elements are presented in the environment when a location of the electronic device is within a region of a physical environment that includes one or more locations corresponding to the one or more products. In some examples, the one or more products are associated with one or more indications of user intent to purchase the one or more products detected by the electronic device (e.g., as shown and described with reference to FIGS. 3A-3I). For example, the one or more indications of user intent to purchase the one or more products are previously detected by the electronic device prior to the location of the electronic device being within the region of the physical environment. In some examples, the one or more products are identified from a repository of information stored in a memory of the electronic device and/or associated with a respective application (e.g., such as a notes application as shown and described with reference to FIG. 3G). For example, the repository of information includes information associated with the one or more products (e.g., the information is used to populate in a shopping list included in a file of an application).

In some examples, in FIGS. 4A-4K, environment 404 has one or more characteristics of environment 304 shown and described with reference to FIGS. 3A-3I. In some examples, electronic device 402 has one or more characteristics of electronic device 302 shown and described with reference to FIGS. 3A-3I. In some examples, display generation component 430 has one or more characteristics of display generation component 330 shown and described with reference to FIGS. 3A-3I. In some examples, image sensors 414a-414c have one or more characteristics of image sensors 314a-314c shown and described with reference to FIGS. 3A-3I. In some examples, hardware buttons 460a-460b have one or more characteristics of hardware buttons 360a-360b shown and described with reference to FIGS. 3A-3I.

In some examples, the one or more virtual elements (e.g., virtual elements 414 and 416a-416b shown and described with reference to FIG. 4B) are optionally displayed by a display component of a second device in communication with electronic device 402 (e.g., instead of electronic device 402 presenting the one or more virtual elements in a virtual environment, such as environment 404). For example, electronic device 402 detects one or more inputs (e.g., through detection of the physical environment) using image sensors 414a-414c, and, in response to detecting the one or more inputs, the one or more virtual elements (e.g., virtual element 418a) are displayed on the display component of the second device (e.g., the content is displayed on a display of a mobile phone in communication with electronic device 402). In some examples, electronic device 402 optionally does not include one or more displays (e.g., display generation component 430) and optionally does not present a three-dimensional environment (e.g., environment 404) to the user of electronic device 402.

Figure 4A:
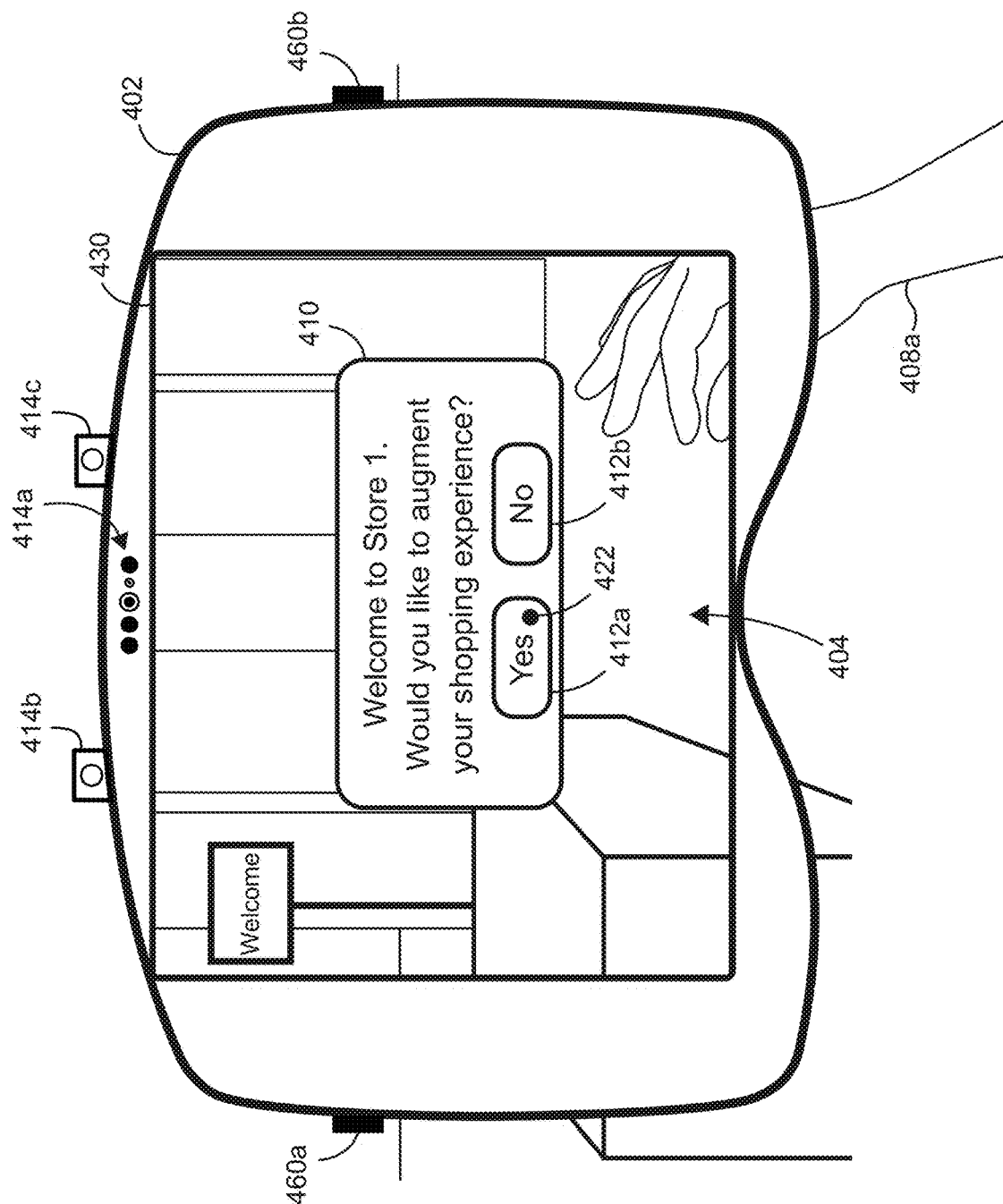
FIGS. 4A-4K illustrate an exemplary method for presenting one or more virtual elements associated with one or more products in an environment based on a location of an electronic device according to some examples of the disclosure.

FIG. 4A illustrates a user of electronic device 402 entering a region of a physical environment that includes one or more locations corresponding to one or more products. For example, the region of the physical environment is a store where the one or more products can be purchased. For example, the region of the physical environment corresponds to first region 324a selected by user of electronic device 302 in FIGS. 3E-3F. Alternatively, the region of the physical environment does not correspond to a region previously selected by the user of electronic device 402. For example, electronic device 402 detects that a current location of electronic device 402 corresponds to a store where one or more products from a shopping list are available for purchase (e.g., the shopping list is optionally not a store-specific shopping list) (e.g., in accordance with a determination that the current location of electronic device 402 corresponds to a store where one or more products from a shopping list are available for purchase, electronic device 402 presents one or more virtual elements associated with the one or more products in environment 404 (e.g., as described below)). In some examples, the one or more products were previously (e.g., before entering the store) detected and/or identified (e.g., through image and/or object recognition) by electronic device 402 (e.g., using image sensors 414a-414c). For example, electronic device 402 detects that a user of electronic device 402 has a quantity of the one or more products that is less than a threshold amount (e.g., as described with reference to FIGS. 3A-3I). For example, electronic device 402 detects one or more indications of user intent to purchase the product (e.g., the product corresponds to product 306 shown and described with reference to FIGS. 3A-3F). In some examples, information associated with the product is included in a file of an application (e.g., the product is included on a shopping list in a note (e.g., file) of a notes application (e.g., as shown and described with reference to FIG. 3G)).

In some examples, electronic device 402 presents one or more virtual elements in environment 404 to virtually augment a shopping experience for a user of electronic device 402 in accordance with a determination that the location of electronic device 402 is within a store that includes the one or more products. For example, electronic device 402 presents one or more virtual elements in environment 404 for helping the user navigate to one or more locations within the store corresponding to the one or more products (e.g., the one or more virtual elements include the aisle and/or shelf numbers of the one or more products within the store). For example, electronic device 402 presents one or more virtual elements in environment 404 for facilitating the purchase of the one or more products through a digital payment service (e.g., the one or more virtual elements lead the user of electronic device 402 through the digital payment process). In some examples, the store supports the presentation of the one or more virtual elements and/or digital payment process. For example, the store (e.g., a third party) provides information (e.g., through data and/or a database) associated with the one or more products and/or the location of the one or more products within the store (e.g., the information is used by electronic device 402 to present the one or more virtual elements in environment 404). For example, the store optionally includes one or more devices (e.g., cameras and/or sensors) for verifying that a purchase of the one or more products has been successfully completed (e.g., the one or more devices are arranged in proximity to an exit of the store (e.g., at a checkout counter and/or exit way)). In some examples, electronic device 402 is optionally configured to communicate with the one or more devices. Presenting one or more virtual elements in environment 404 associated with one or more products when (i) the user intends to purchase the one or more products (e.g., based on previously detected user interaction that is associated with the one or more products) and (ii) the user is located within a store where the one or more products can be purchased improves user-device interaction and conserves computing resources.

As shown in FIG. 4A, a virtual element 410 is presented by electronic device 402 in environment 404. In some examples, virtual element 410 is presented in environment 404 when electronic device 402 determines that a detected location of electronic device 402 is within the region of the physical environment (e.g., the store) that includes the one or more products (e.g., the one or more products are associated with one or more indications of user intent (e.g., to purchase the one or more products) detected by electronic device 402). In some examples, virtual element 410 corresponds to a virtual message welcoming the user of electronic device 402 to a store. In some examples, as shown in FIG. 4A, virtual element 410 includes one or more selectable options for augmenting the shopping experience of the user of electronic device 402. For example, virtual element 410 includes a first selectable option 412a that is selectable (e.g., through a user input having one or more characteristics of a user input described above) to present one or more virtual elements associated with the one or more products in environment 404. For example, virtual element 410 includes a second selectable option 412b that is selectable to forgo presenting the one or more virtual elements associated with the one or more products in environment 404. As shown in FIG. 4A, electronic device 402 detects the user of electronic device 402 provide an input corresponding to selection of first selectable option 412a. Particularly, gaze 422 is directed to first selectable option 412a while an air gesture (e.g., an air pinch) is concurrently performed by hand 408a, as shown in FIG. 4A.

Figure 4B:
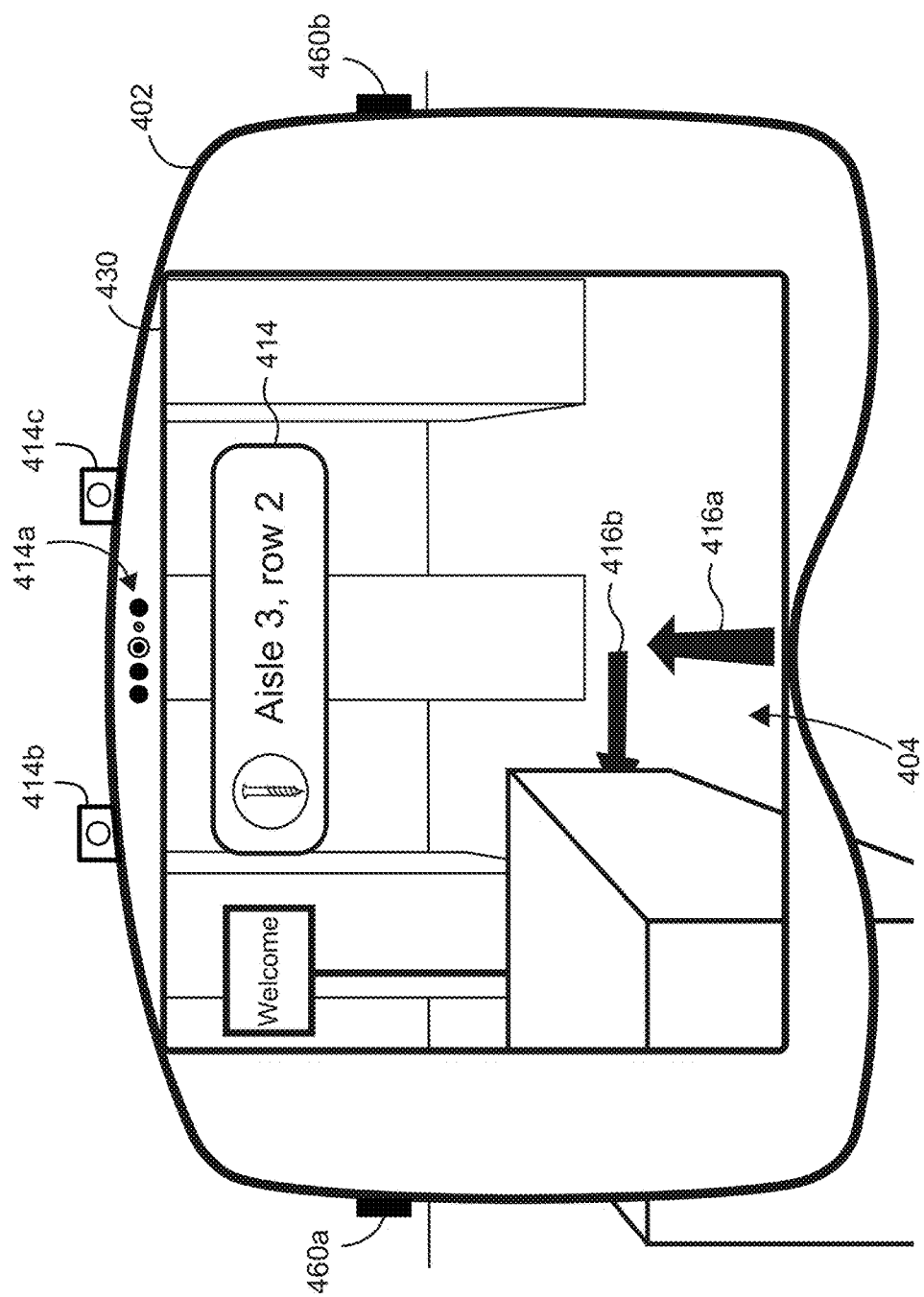

FIG. 4B illustrates electronic device 402 presenting virtual elements 414, 416a and 416b in environment 404 in response to the input provided by the user of electronic device 402 in FIG. 4A. Alternatively, in some examples, virtual elements 414, 416a and 416b are presented in environment 404 in response to electronic device 402 determining that a location of electronic device 402 is within a store including the one or more products (e.g., or that the location of electronic device 402 is within a store that is previously identified as the preferred store for purchasing the one or more products (e.g., as shown and described with reference to FIGS. 3E-3F)). For example, in accordance with the determination that the location of electronic device 402 is within the store that includes the one or more products, electronic device 402 presents virtual elements 414, 416a and 416b automatically, optionally without presenting virtual element 410 shown in FIG. 4A. As shown in FIG. 4B, virtual element 414 includes a logo for identifying a first product (e.g., screws) and a location of a first product within the store. For example, the location of the first product within the store corresponds to the aisle, row and/or bin number of the first product within the store. In some examples, virtual element 414 includes a name of the first product and/or other information associated with the first product (e.g., a brand name and/or product specifications (e.g., size, material, color, type, etc.)). In some examples, the first product corresponds to a first product on a shopping list (e.g., from a file of an application as shown and described with reference to FIG. 3G). In some examples, the first product corresponds to a product on the shopping list that is closest to a current location of electronic device 402 within the store. In some examples, electronic device 402 determines an order for a set of navigation directions to present to the user for multiple products of a shopping list based on the locations of the products within the store (e.g., products located within the same region of the store are navigated to sequentially (e.g., to lead the user of electronic device 402 along an efficient route in the store for obtaining the products)). As shown in FIG. 4B, virtual element 414 is presented in an upper region of environment 404 from the viewpoint of the user of electronic device 402. In some examples, virtual element 414 is alternatively presented in a different region of environment 404 from the viewpoint of the user of electronic device 402 (e.g., in a bottom region, a side region, a corner of environment 304 and/or an empty space (e.g., not including one or more objects) in environment 404). In some examples, virtual element 414 is presented in a world-locked orientation such that virtual element 414 is not presented with a distance or orientation offset relative to the user of electronic device 402) in environment 404 at a location corresponding to the aisle of the first product (e.g., aisle three) in environment 404. In some examples, virtual element 414 is alternatively presented in a head-locked and/or body-locked orientation. For example, as the user navigates to the first product, virtual elements 414 maintains its presentation location in environment 404 relative to the viewpoint of the user of electronic device 402). In some examples, virtual element 414 is optionally presented with virtual elements 416a and 416b concurrently, though it should be understood that, in other examples, electronic device 402 presents virtual element 414 without also presenting virtual elements 416a and 416b.

As shown in FIG. 4B, virtual elements 416a and 416b correspond to navigational elements (e.g., arrows) for guiding the user of electronic device 402 to the location (e.g., the aisle and row included in virtual element 414) corresponding to the first product. In FIG. 4B, virtual elements 416a and 416b are presented on a visible floor surface in environment 404. In some examples, virtual elements 416a and 416b are alternatively presented in a different region of environment 404 (e.g., not on a surface). In some examples, electronic device 402 presents a different quantity of navigational elements in environment 404 (e.g., electronic device 402 presents a single arrow that includes curvature). In some examples, presenting virtual elements 416a and 416b in environment 404 includes presenting one or more visual and/or audio cues while the user of electronic device 402 navigates to (e.g., walks to or otherwise travels to) the first product. For example, as the user navigates to the location within the store corresponding to the first product, the size, shape, orientation and/or location of the virtual elements 416a and 416b are updated to reflect updated navigation to the first product (e.g., relative to the current position (e.g., location and/or orientation) of electronic device 402). For example, virtual elements 416a and 416b are changed in brightness and/or color based on whether the user of electronic device 402 navigates correctly toward the first product. For example, electronic device 402 provides an audio output to the user to assist with the navigation to the first product (e.g., the audio output includes verbal directions).

In some examples, virtual elements 414 and/or 416a-416b are displayed via a display component of a second device (e.g., optionally different from display generation component 430) in communication with electronic device 402 (e.g., second device corresponds to a mobile phone or computer tablet). For example, electronic device 402 optionally does not include display generation component 430 and optionally does not present environment 404. In some examples, virtual elements 414 and/or 416a-416b are presented through a respective application that is accessed through the second device in communication with electronic device 402 (e.g., the respective application is accessed through a mobile phone, tablet, and/or smart watch). In some examples, virtual elements different from virtual elements 414 and/or 416a-416b are displayed via the display component. For example, a list of directions and/or a floor map of the store are displayed via the display component that assists the user of electronic device 402 in navigating to the location of the first product within the store. In some examples, electronic device 402 and/or the second device in communication with electronic device 402 optionally provides audio output (e.g., corresponding to verbal directions) to the user of electronic device 402.

Figure 4C:
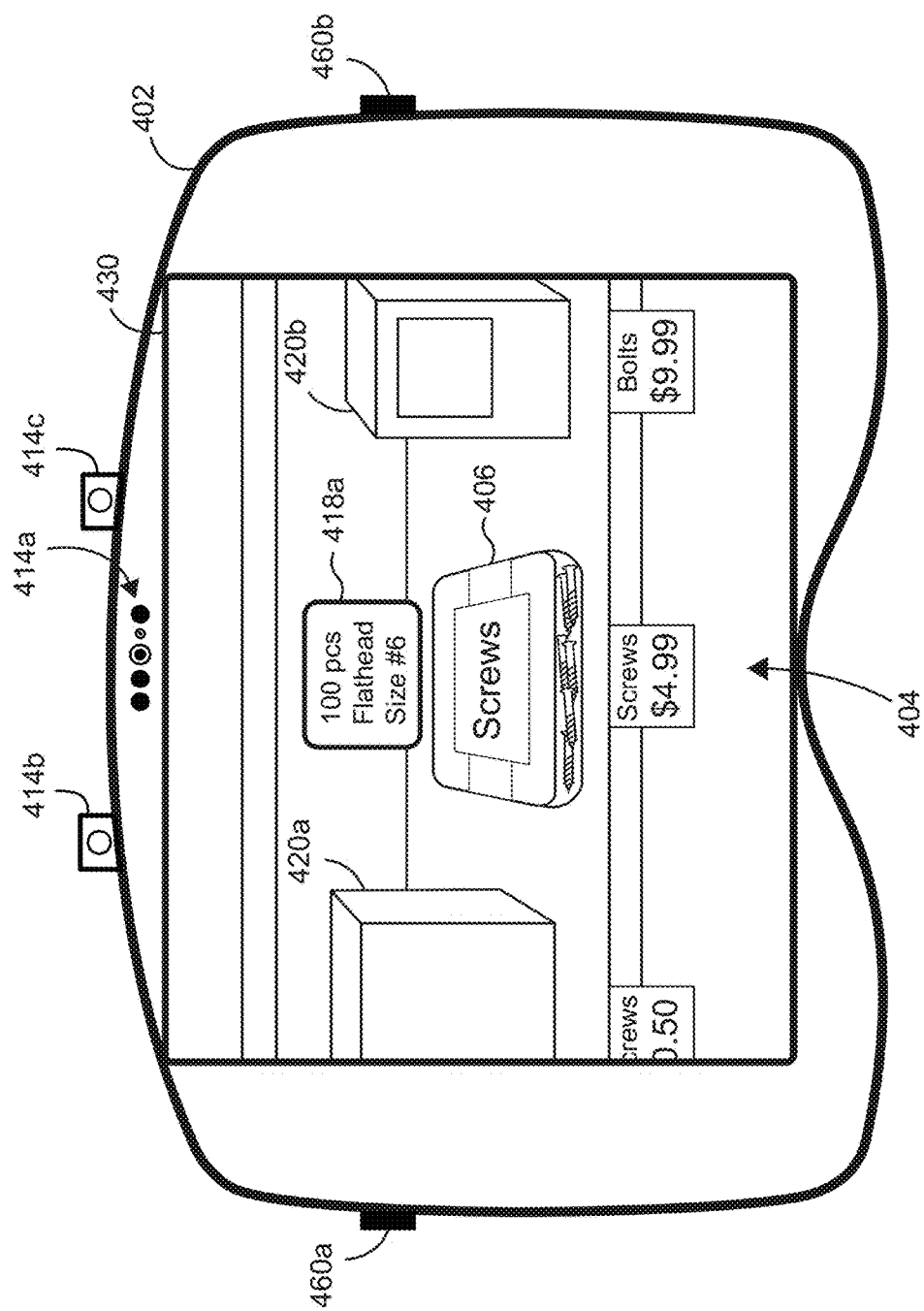

FIG. 4C illustrates electronic device 402 presenting a virtual element 418a in environment 404 based on a first product 406 being within a field-of-view of the user of electronic device 402 (e.g., and within the field-of-view of electronic device 402). In some examples, first product 406 is in the field-of-view of the user of electronic device 402 because the user has navigated to the location of first product 406 (e.g., using virtual elements 414, 416a and 416b presented in environment 404 in FIG. 4B). As shown in FIG. 4C, the user of electronic device 402 is positioned in front of a shelf that includes first product 406 (e.g., first product is located between products 420a and 420b on the shelf). In some examples, as shown in FIG. 4C, electronic device 402 ceases to present virtual elements 414, 416a and 416b when first product 406 is within the field-of-view of the user of electronic device 402. In some examples, virtual element 418a (e.g., or virtual content having one or more characteristics of virtual element 418a) is optionally displayed via a display component (e.g., different from display generation component 430) in communication with electronic device 402. For example, electronic device 402 optionally does not include display generation component 430 and/or present virtual environment 404.

In some examples, virtual element 418a includes information associated with first product 406. For example, as shown in FIG. 4C, virtual element 418a includes product specifications (e.g., the quantity of screws in a package, the screw type and size). Additionally or alternatively, in some examples, virtual element 418a includes a product name, brand name, price and/or customer reviews. As shown in FIG. 4C, virtual element 418a is presented above first product 406 in environment 404 from the viewpoint of the user of electronic device 402. In some examples, virtual element 418a is alternatively presented at a different location in environment 404 (e.g., an upper region, a lower region, a side of first product 406, a corner region and/or in empty space of environment 404). In some examples, electronic device 402 ceases to present virtual element 418a in environment 404 in response to user input (e.g., an input selecting a virtual affordance included in virtual element 418a for ceasing to present virtual element 418a, an air gesture, providing less than a threshold amount (e.g., less than 0.1, 0.2, 0.5, 1, 2, or 5 minutes) of attention (e.g., gaze) directed to virtual element 418a and/or first product 406, providing an audio input (e.g., verbal command), providing an input through a hardware device (e.g., hardware buttons 460a and/or 460b) and/or providing an input through a touch-sensitive surface (e.g., in communication with electronic device 402)). In some examples, electronic device 402 does not present virtual element 418a in environment 404, thereby minimizing the number of virtual objects presented in environment 304 and conserving computing resources.

Figure 4D:
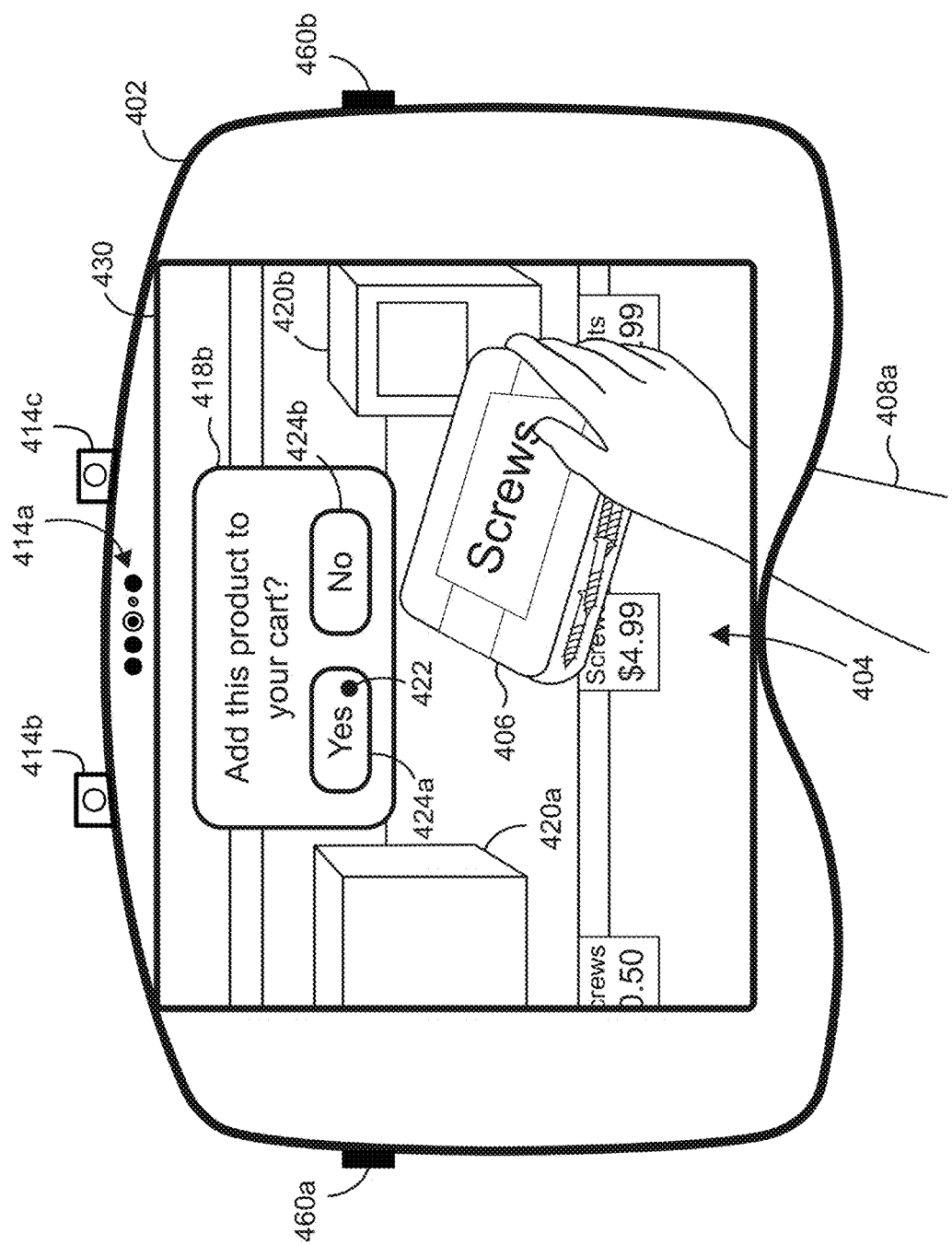

FIG. 4D illustrates electronic device 402 presenting a virtual element 418b in environment 404. In some examples, electronic device 402 presents virtual element 418b in environment 404 in response to user interaction with first product 406. For example, as shown in FIG. 4D, the user of electronic device 402 lifts (e.g., grabs and/or moves) first product 406 from the shelf with hand 408a. In some examples, in response to detecting the user lifting first product 406 from the shelf, electronic device 402 presents virtual element 418b in environment 404). In some examples, electronic device 402 alternatively presents virtual element 418b in environment 404 in response to detecting attention (e.g., gaze) of the user of electronic device 402 directed to first product 406 (e.g., for more than a threshold period of time (e.g., 0.1, 0.2, 0.5, 1, 2, 5 or 10 seconds)). In some examples, electronic device 402 presents virtual element 418b in environment 404 in response to detecting the user of electronic device 402 lifting first product 406 from the shelf and moving first product 406 to outside of a threshold distance from the shelf (e.g., 0.5, 1, 2, 5, 10, 15, 20, 25, or 50 meters). In some examples, electronic device 402 presents virtual element 418b in environment 404 in response to detecting a different user input, such as an audio input (e.g., including a verbal command), an air gesture (e.g., as shown and described with reference to FIG. 4G), an input provided through a hardware device (e.g., hardware buttons 460a and/or 460b) and/or an input provided through a touch-sensitive surface (e.g., in communication with electronic device 402). Presenting virtual element 418b in environment 404 in response to detecting user interaction with first product 406 enables virtual element 418b to be presented when the user of electronic device 402 intends to add first product 406 to a digital shopping cart (e.g., as described below) and/or purchase first product 406a, thereby improving user-device interaction and conserving computing resources.

In some examples, virtual element 418b includes one or more selectable options for adding first product 406 to a digital shopping cart. As shown in FIG. 4D, virtual element 418b includes a first selectable option 424a and a second selectable option 424b. In some examples, first selectable option 424a is selectable to add first product 406 to the digital shopping cart. In some examples, second selectable option 424b is selectable to forgo adding first product 406 to the digital shopping cart. In some examples, first selectable option 424a and second selectable option 424b are selectable through user input (e.g., having one or more characteristics of one or more user inputs described above). In some examples, electronic device 402 ceases to present virtual element 418b in environment 404 in response to detecting an input corresponding to selection of second selectable option 424b. In some examples, electronic device 402 ceases to present virtual element 418b in environment 404 after a threshold period of time (e.g., 0.5, 1, 2, 5, 10, 15, 20, 25, 30, 60 or 90 seconds). Alternatively, in some examples, electronic device 402 does not present virtual element 418b in environment 404 in response to user interaction with first product 406 (e.g., and/or in response to one or more different user inputs described above). For example, in response to detecting user interaction with first product 406, electronic device 402 automatically adds first product 406 to the digital shopping cart (e.g., without presenting virtual element 418b prior to adding first product 406 to the digital shopping cart). Automatically adding first product 406 to the digital shopping cart without presenting a qualifying virtual element (e.g., virtual element 418b) in environment 404 minimizes the presentation of virtual objects in environment 404 and conserves computing resources.

Figure 4E:
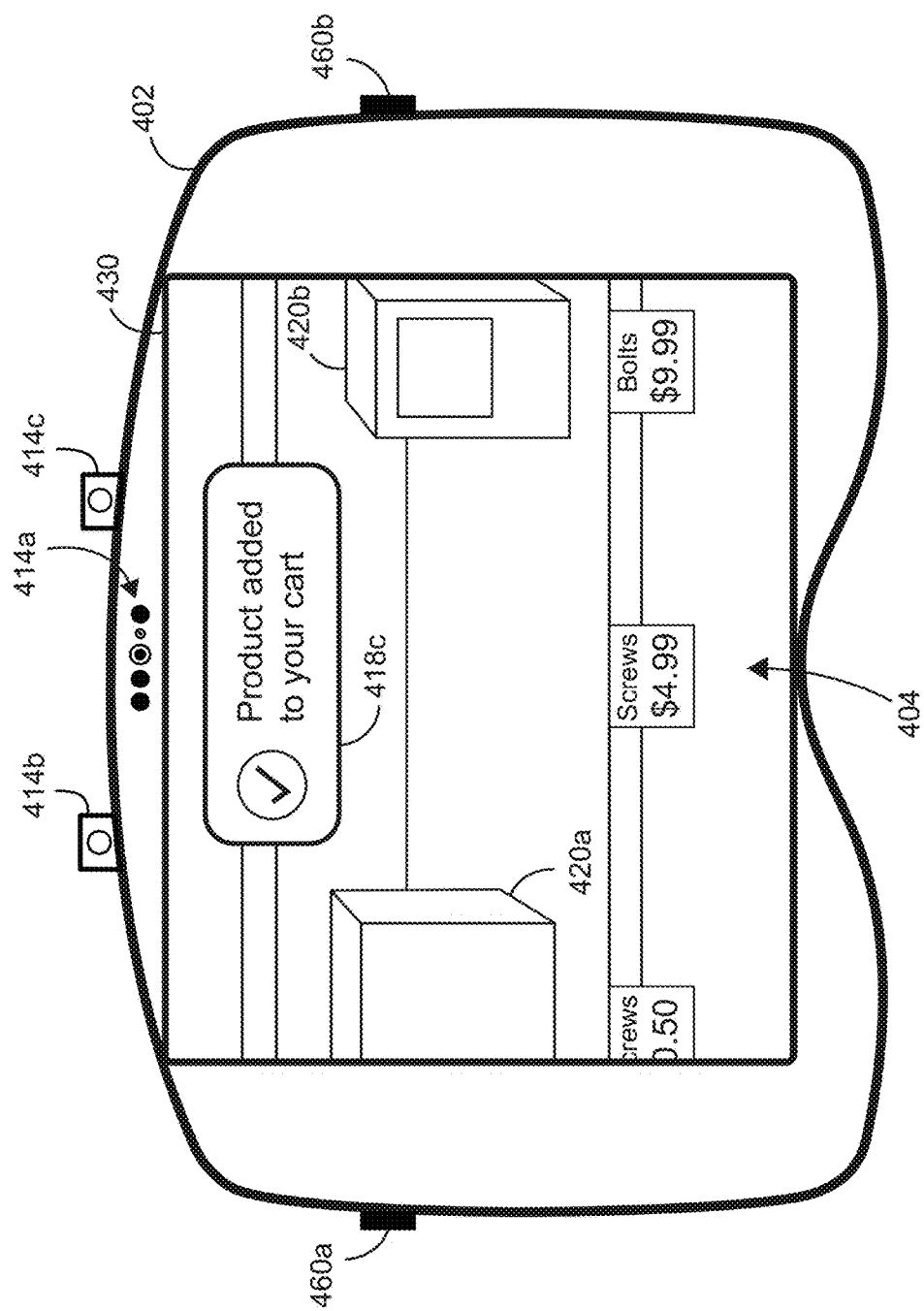

As shown in FIG. 4D, the user of electronic device 402 provides an input corresponding to selection of first selectable option 424a (e.g., the user of electronic device 402 provides gaze 422 directed to first selectable option 424a while concurrently performing an air gesture with hand 408a). In some examples, in response to detecting the input corresponding to selection of first selectable option 424a, electronic device 402 adds first product 406 to the digital shopping cart. In some examples, electronic device 402 provides visual and/or audio indications to confirm first product 406 is added to the digital shopping cart. For example, as shown in FIG. 4E, electronic device 402 presents a virtual element 418c in environment 404 corresponding to a visual confirmation that first product 406 has been added to the digital shopping cart. In some examples, in addition to (e.g., or instead of) presenting virtual element 418c in environment 404, electronic device 402 provides an audio output to the user of electronic device 402 (e.g., through an output device of electronic device 402 and/or an output device of a device (e.g., mobile phone, tablet and/or smart watch) in communication with electronic device 402) to provide feedback that first product 406 has been added to the digital shopping cart. In some examples, electronic device 402 ceases to present virtual element 418c in environment 404 after 1, 2, 5, 10, 15 20, 25, 30, 45, 60 or 120 seconds of presentation time in environment 404. In some examples, electronic device 402 ceases to present virtual element 418c in response to a user input (e.g., an input selecting a virtual affordance included in virtual element 418c for ceasing to present virtual element 418c, an air gesture, providing less than a threshold amount (e.g., less than 0.1, 0.2, 0.5, 1, 2, or 5 minutes) of attention (e.g., gaze) directed to virtual element 418c, providing an audio input (e.g., verbal command), providing an input through a hardware device (e.g., hardware buttons 460a and/or 460b) and/or providing an input through a touch-sensitive surface (e.g., in communication with electronic device 402)).

Figure 4F:
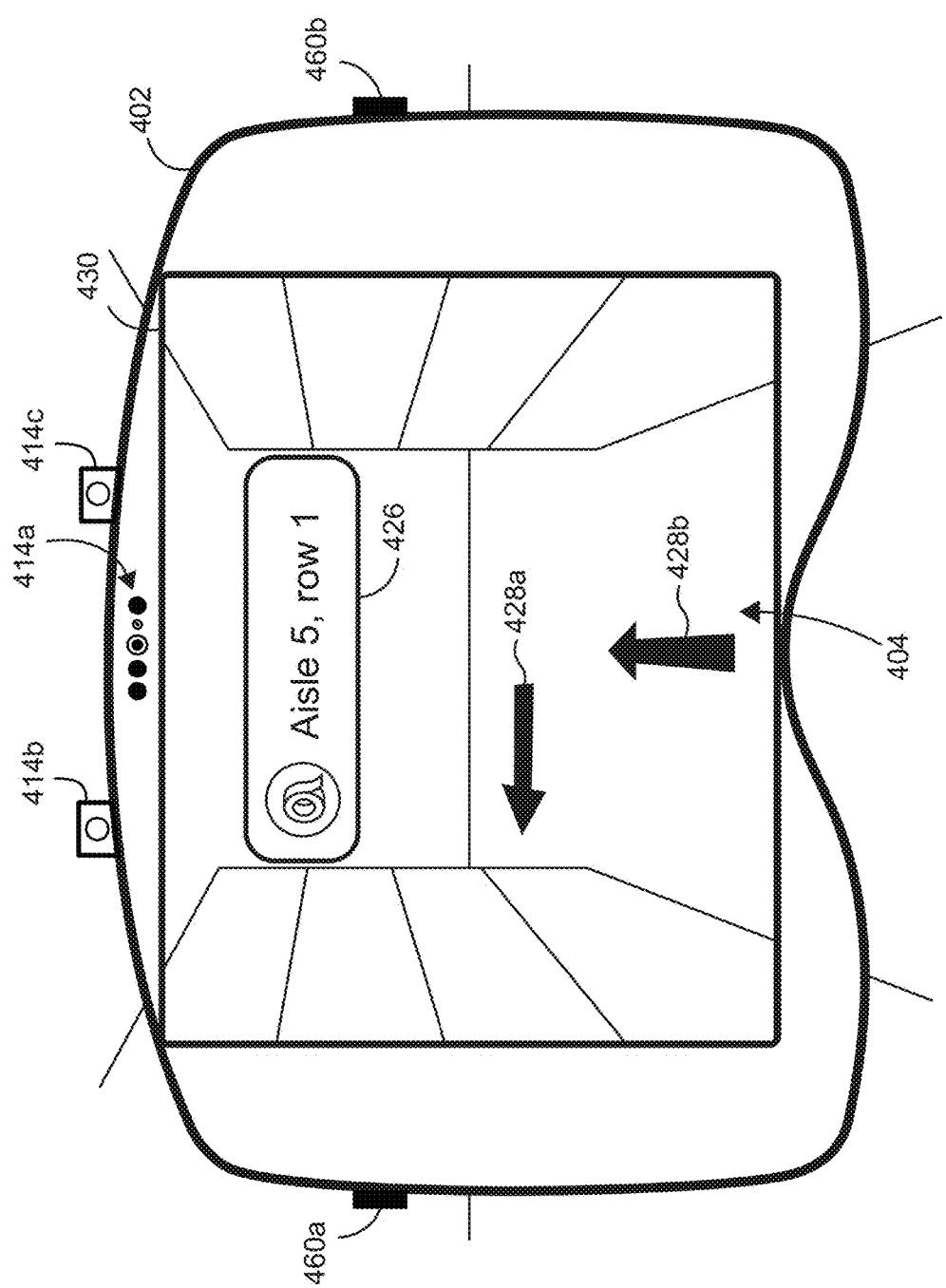

FIG. 4F illustrates electronic device 402 presenting one or more virtual elements associated with a second product in environment 404 in response to the input provided by the user of electronic device 402 in FIG. 4D (e.g., after adding first product 406 to the digital shopping cart). As shown in FIG. 4F, the second product is a roll of tape (e.g., as represented by the icon of the second product included in virtual element 426). In some examples, the second product is a different product from first product 406 included on the same shopping list (e.g., such as the shopping list shown and described with reference to FIG. 3G). In some examples, electronic device 402 detects (e.g., prior to entering the store) that a quantity (e.g., an estimated quantity) of the second product that the user of electronic device 402 is in possession of is less than the threshold amount (e.g., as shown in FIGS. 3A-3C, electronic device 302 detects that an estimated quantity of product 306 is less than a threshold amount). In some examples, electronic device 402 detects (e.g., prior to entering the store) one or more indications of user intent to purchase the second product (e.g., as shown in FIGS. 3D-3 to 3F, electronic device 302 detects one or more user inputs corresponding to intent of the user of electronic device 302 to purchase product 306). In some examples, electronic device 402 presents one or more virtual elements associated with the second product (e.g., virtual elements 426, 428a, and/or 428b) in environment 404 following first product 406 based on the order of the products on the shopping list and/or the proximity (e.g., distance) of the second product from the first product within the store. In some examples, presenting virtual element 426 in environment 404 has one or more characteristics of presenting virtual element 414 in environment 404 as shown and described with reference to FIG. 4B. In some examples presenting virtual elements 428a and 428b in environment 404 has one or more characteristics of presenting virtual elements 416a and 416b in environment 404 as shown and described with reference to FIG. 4B.

Figure 4G:
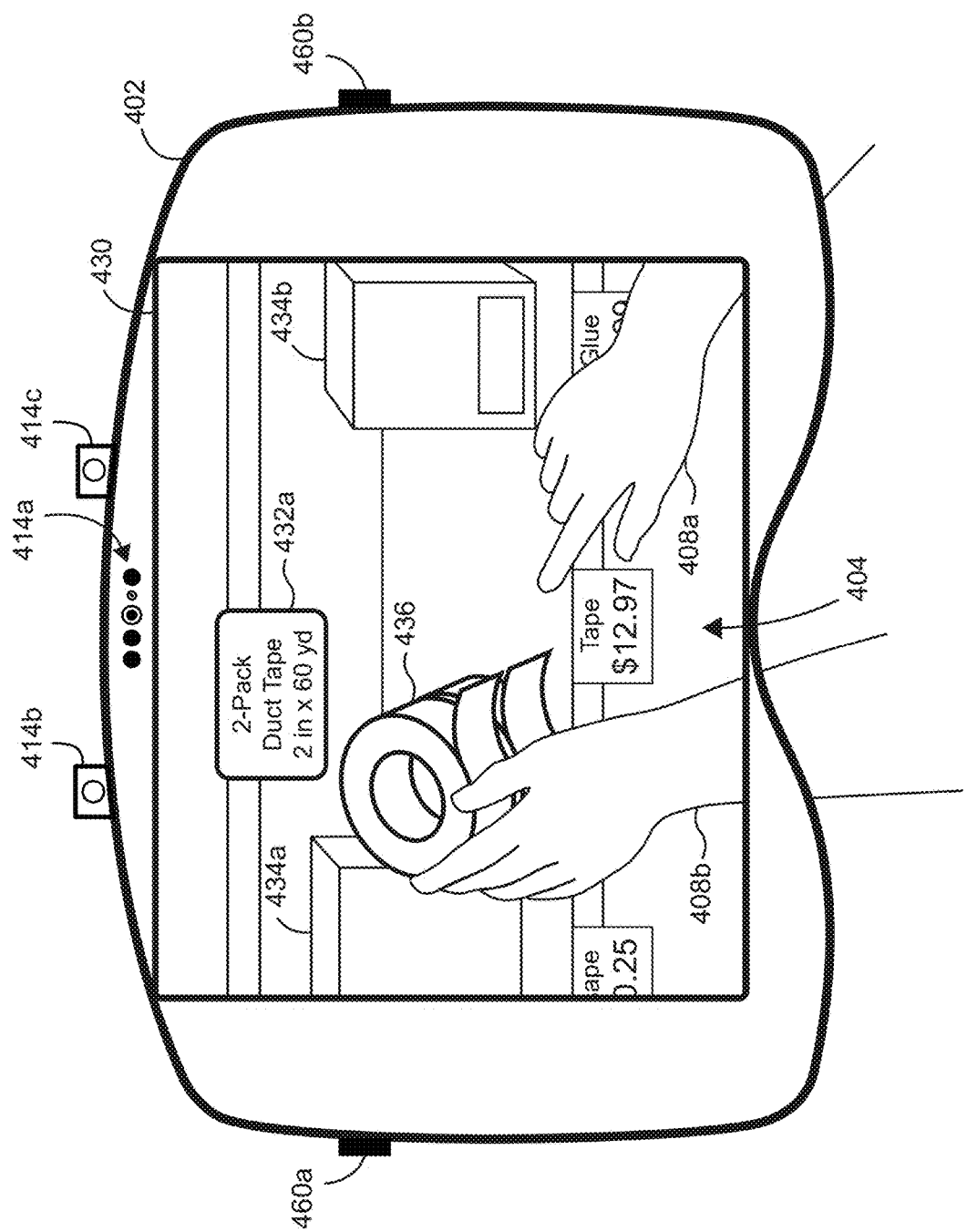

FIG. 4G illustrates electronic device 402 presenting a virtual element 432a in environment 404 in response to second product 436 being within a field-of-view of the user of electronic device 402 (e.g., and of electronic device 402). In some examples, second product 436 is in the field-of-view of the user of electronic device 402 because the user has navigated to the location of second product 436 using virtual elements 426, 428a and 428b presented in environment 404 in FIG. 4F. As shown in FIG. 4G, the user of electronic device 402 views a shelf that includes second product 436 (e.g., second product 436 is located between products 434a and 434b on the shelf). In some examples, presenting virtual element 432a in environment 404 has one or more characteristics of presenting virtual element 418a in environment 404 as described with reference to FIG. 4C.

Figure 4H:
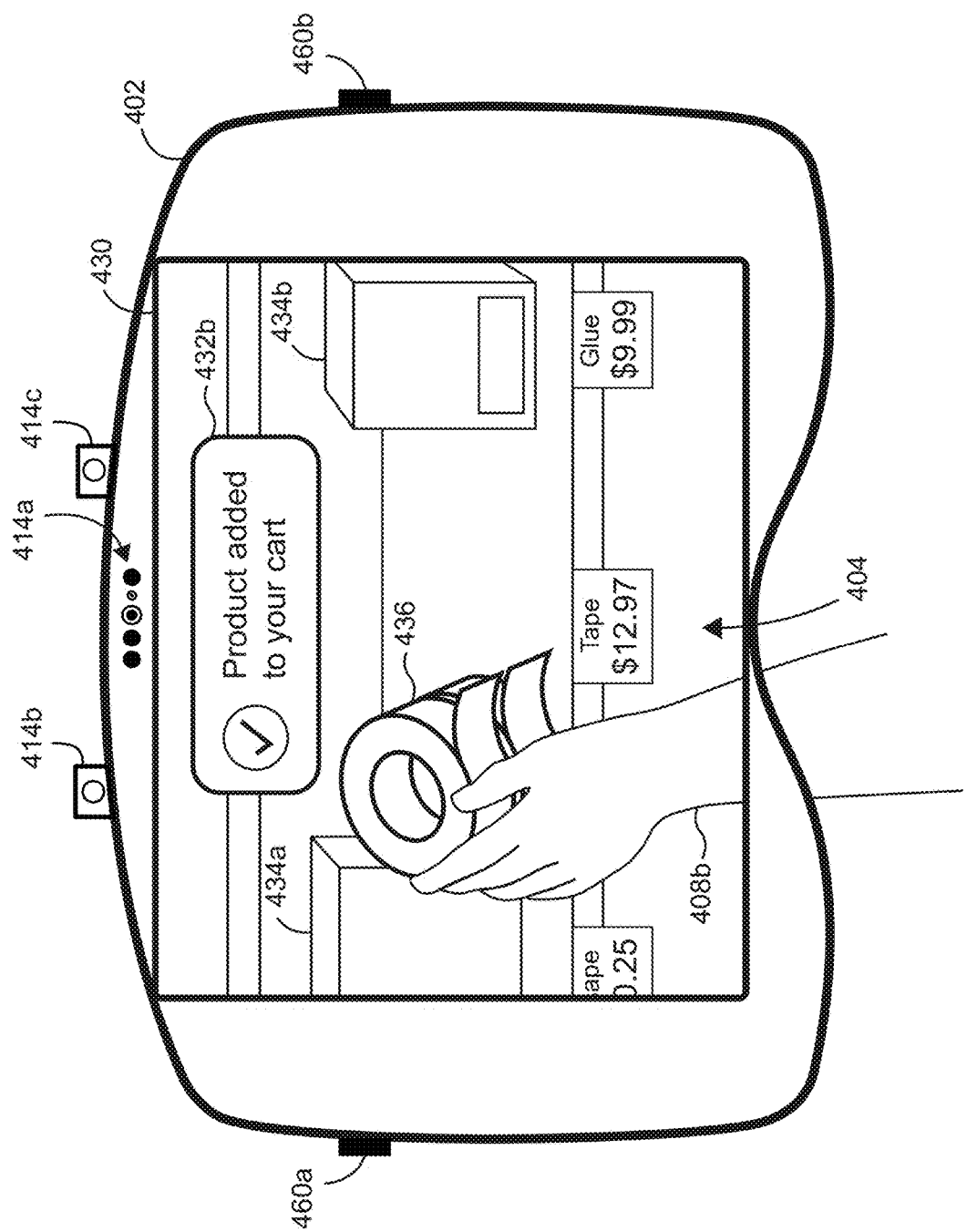

In FIG. 4G, electronic device 402 detects user interaction with second product 436. Particularly, the user of electronic device 402 lifts (e.g., grabs and/or moves) second product 436 with hand 408b. In some examples, electronic device 402 adds second product 436 to the digital shopping cart in response to detecting the user interaction (e.g., the lift of second product 436 with hand 408b). As shown in FIG. 4G, the user of electronic device 402 performs an air gesture using hand 408a. Particularly, hand 408a performs a pointing gesture that is directed toward second product 436. In some examples, in response to detecting the air gesture performed by hand 408a, electronic device 402 adds second product 436 to the digital shopping cart discussed above. It should be appreciated that, in some examples, the air gesture can include different gestures from what is shown in FIG. 4G, such as an air gesture having one or more characteristics of the one or more air gestures described with reference to FIG. 3C. As shown in FIG. 4H, based on the detected interaction of the user of electronic device 402 with second product 436 and/or air gesture, electronic device 402 adds second product 436 to the digital shopping cart. Accordingly, in FIG. 4H, electronic device 402 presents a virtual element 432b in environment 304 corresponding to a visual confirmation that second product 436 is added to the digital shopping cart. In some examples, presenting virtual element 432b in environment 304 has one or more characteristics of presenting virtual element 418c in environment 304 shown and described with reference to FIG. 4E. Adding second product 436 to the digital shopping cart in response to detecting the air gesture performed by hand 408a ensures the user of electronic device 402 intends to add second product 436 to the digital shopping cart and/or purchase second product 436, thereby reducing errors in interaction and conserving computing resources associated with correcting errors.

Figures 1, 4I:
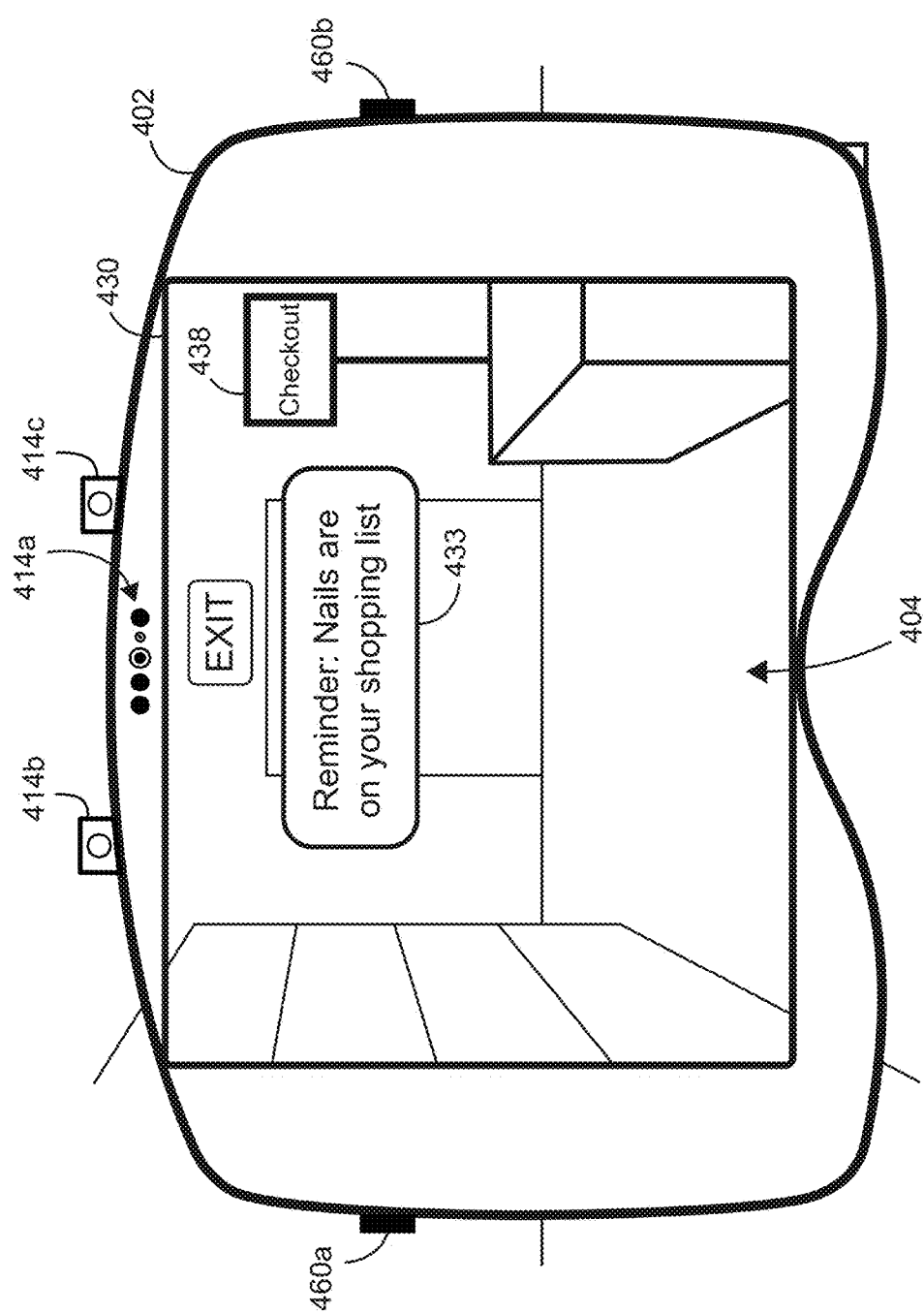
Figures 2, 4I:
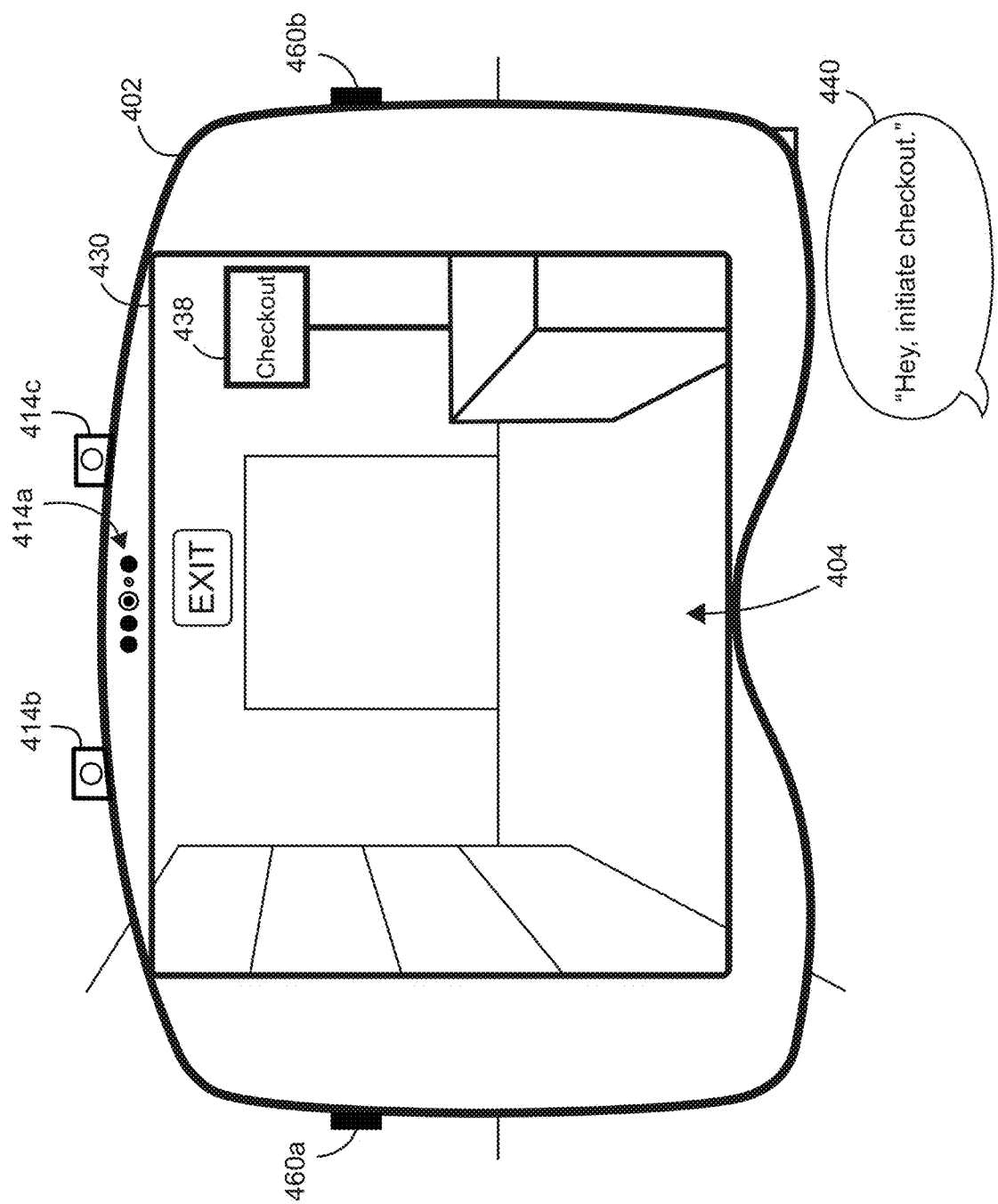

FIG. 4I-1 illustrates electronic device 402 presenting, via display generation component 430, a virtual element 433 indicating that one or more products of interest to a user of electronic device 402 are not currently in the digital shopping cart (e.g., or optionally a real-world (e.g., physical) shopping cart). As shown in FIG. 4I-1, virtual element 433 indicates that a product (e.g., nails) associated with a shopping list (e.g., the shopping list included in user interface 328 as shown and described with reference to FIG. 3G) has not yet been added to the digital shopping cart (e.g., electronic device 402 has not detected user interaction that triggers electronic device 402 to add the product to the digital shopping cart, such as the user interaction shown and described with reference to FIG. 4G). In some examples, electronic device 402 presents virtual element 433 in accordance with a determination that one or more criteria are satisfied. For example, the one or more criteria includes a criterion that is satisfied when a product from a shopping list is available for purchase within a respective region of the physical environment (e.g., a store) within which the electronic device 402 is currently located, and the product is not currently included in an active digital shopping cart (e.g., the digital shopping cart includes one or more products that have not yet been purchased). Additionally, for example, the one or more criteria includes a criterion that is satisfied when electronic device 402 detects that a user of electronic device 402 is located and/or moving toward an exit (e.g., a checkout counter 438) of the respective region of the physical environment. Additionally, or alternatively, for example, the one or more criteria includes a criterion that is satisfied when electronic device 402 detects that a user of electronic device 402 has exited the respective region of the physical environment (e.g., electronic device 402 detects that a current location of electronic device 402 is outside of the respective region of the physical environment).

Figure 4J:
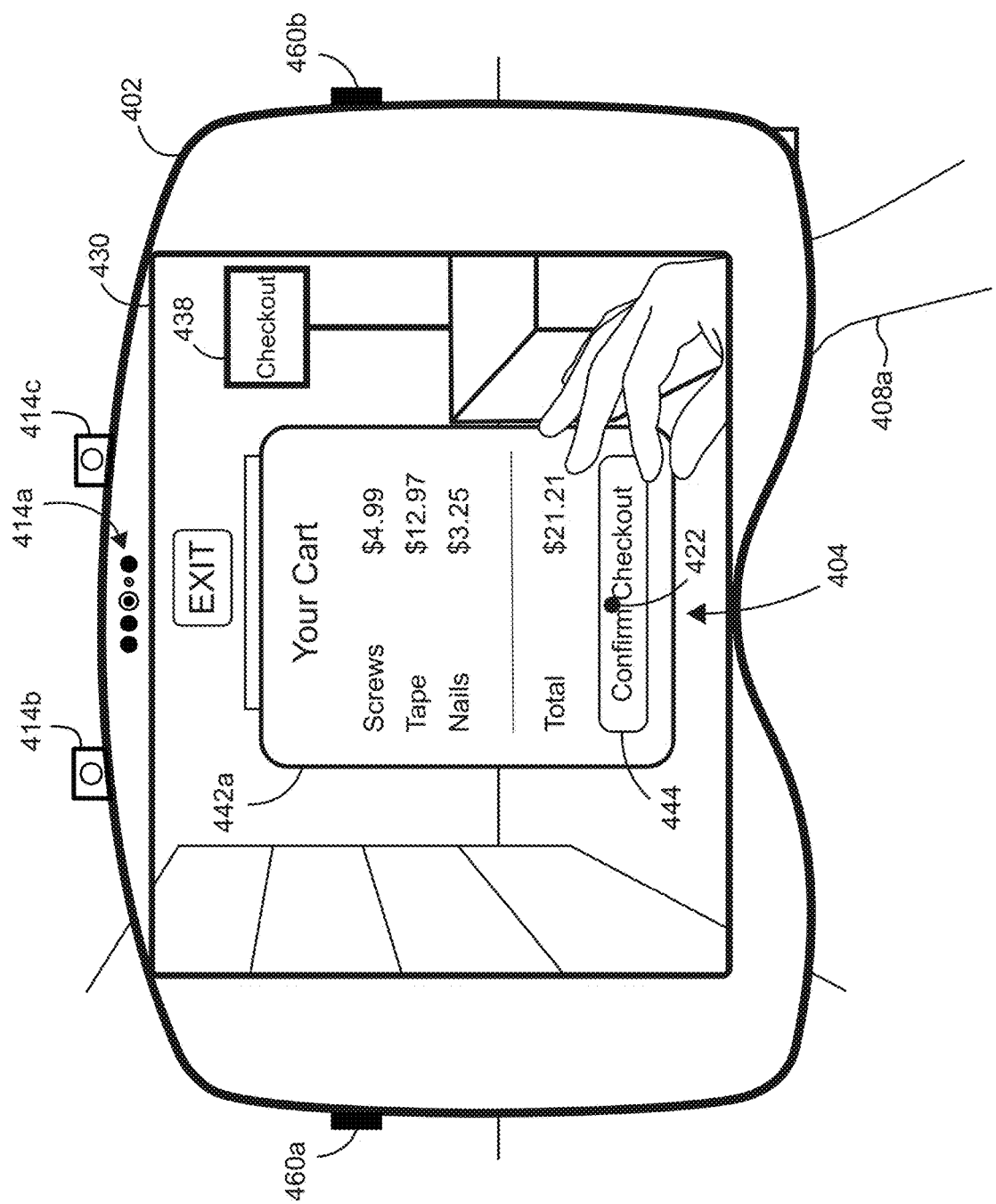
Figure 4K:
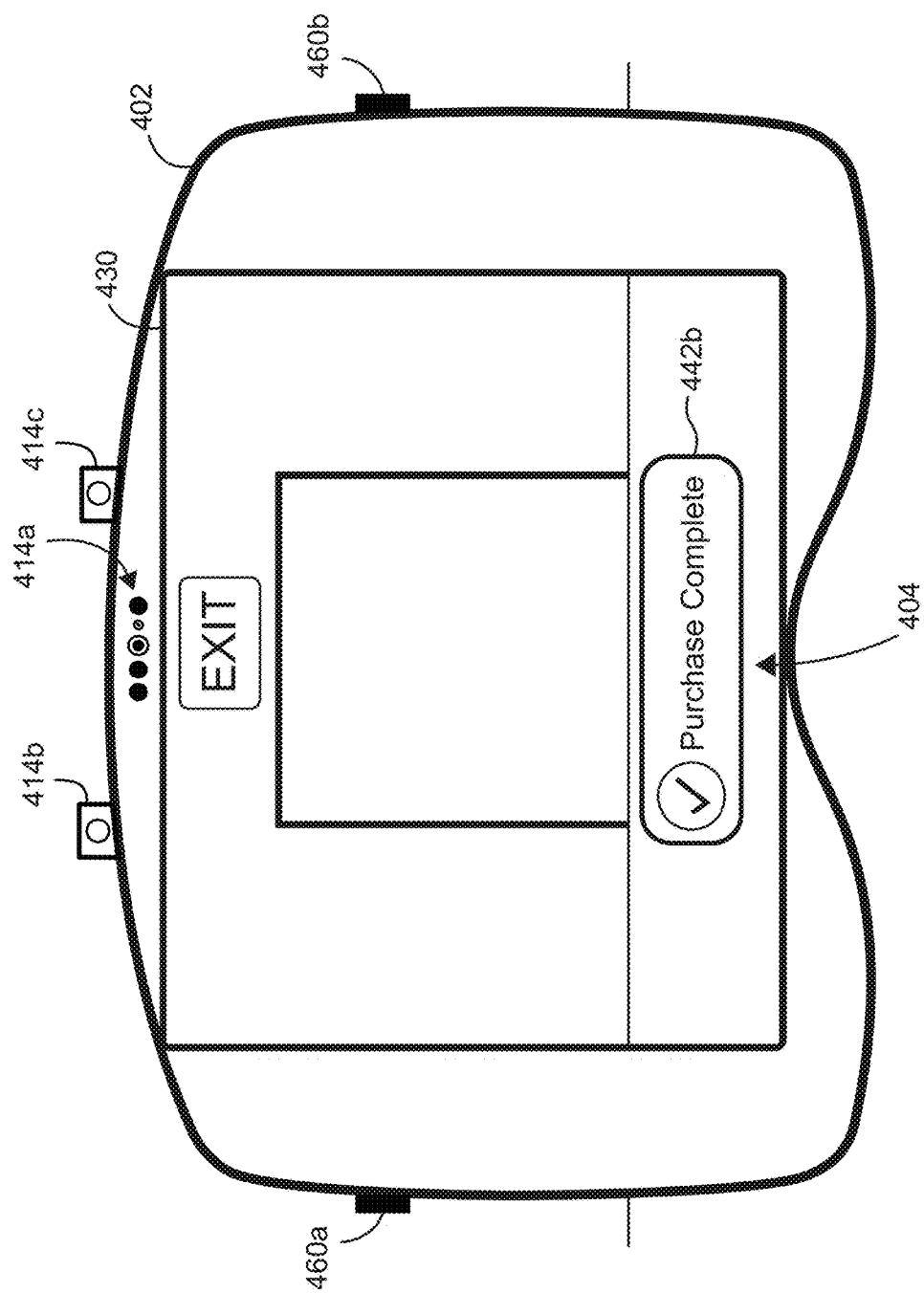

FIGS. 4I-2 to 4K illustrate electronic device 402 facilitating the purchase of one or more products (e.g., including first product 406 and/or second product 436) in the digital shopping cart discussed above. For example, electronic device 402 facilitates the purchase of the one or more products by presenting one or more virtual elements in environment 404 for guiding the user of electronic device 402 through the digital purchasing process. In some examples, the one or more virtual elements are associated with a digital payment service. For example, a user interface of the digital payment service (e.g., a user interface of the digital shopping cart) is accessible by the user of electronic device 402 through one or more user inputs (e.g., as described with reference to FIG. 4I-2). In some examples, the user interface of the digital payment service is accessed through a device in communication with electronic device 402 (e.g., a mobile phone, tablet and/or smart watch). In some examples, the digital payment service includes information associated with one or more payment methods (e.g., the payment methods are defined by the user of electronic device 402 through a user interface of the digital payment service and are saved to a user profile). For example, the one or more payment methods includes a default payment method (e.g., a payment method that is preferred by the user based on one or more settings associated with a user profile). In some examples, electronic device 402 permits user access to the digital payment service (e.g., initiates purchase of the one or more products in the digital shopping cart) in accordance with one or more criteria being satisfied. For example, the one or more criteria include a criterion that is satisfied when an identity of the user of electronic device 402 is verified (e.g., using one or more authentication processes, such as biometric authentication (e.g., including voice, retina, facial and/or fingerprint recognition) and/or two-factor authentication (e.g., including entering a password and/or using a second electronic device different from electronic device 402)). Electronic device 402, alternatively or in addition to verifying an identity of the user of electronic device 402 prior to accessing the digital payment service, optionally verifies the identity of the user of electronic device 402 after accessing the digital payment service and prior to completing a purchase of the one or more products included in the digital shopping cart (e.g., electronic device 402 verifies the identity of the user using biometric authentication in response to an input provided by the user of electronic device 402 corresponding to a request to complete the purchase of the one or more products included in the digital shopping cart (e.g., such as the one or more user inputs shown and described with reference to FIG. 4J)). In some examples, the identity of the user of electronic device 402 is verified through a device in communication with electronic device 402 (e.g., mobile phone, tablet and/or smart watch).

FIG. 4I-2 illustrates the user of electronic device 402 providing an input corresponding to a request to initiate purchase of one or more products included in the digital shopping cart (e.g., that satisfies the one or more criteria for accessing the digital payment service). As shown in FIG. 4I-2, the user of electronic device 402 provides an audio input 440 corresponding to a request to initiate purchase of the one or more products included in the digital shopping cart (e.g., audio input 440 is a verbal command). For example, electronic device 402 uses audio input 440 to authenticate a voice of the user of electronic device 402. In some examples, electronic device 402 initiates purchase of the one or more products included in the digital shopping cart through a user input different from a verbal input that satisfies the one or more criteria (e.g., the user input includes an air gesture, an input provided through a hardware device (e.g., hardware button 460a and 460b) and/or an input provided through a touch-sensitive surface). In some examples, the one or more criteria for accessing the digital payment service include a criterion that is satisfied when electronic device 402 is within a threshold distance (e.g., 0.5, 1, 2, 5, 10, 15, 20, 25, or 50 meters) of a location corresponding to an exit of the store. In some examples, the one or more criteria for accessing the digital payment service includes a criterion that is satisfied when one or more devices (e.g., cameras and/or other sensors) located within the store (e.g., at checkout counter 438 and/or in proximity to the exit of the store) identify that one or more products the user of electronic device 402 is in possession of are not currently purchased. The one or more devices are optionally in communication with electronic device 402. In some examples, the purchase of the one or more products is optionally initiated through a second device (e.g., using a respective application associated with the digital payment service) in communication with electronic device 402 (e.g., mobile phone, tablet and/or smart watch).

In some examples, electronic device 402 initiates a process for purchasing the one or more products in the digital shopping cart automatically (e.g., without a direct user input corresponding to a request to initiate the purchase of the one or more products in the digital shopping cart). For example, when electronic device 402 is within the threshold distance of the location corresponding to the exit of the store, electronic device 402 automatically initiates the process for purchasing the one or more products (e.g., electronic device 402 presents virtual element 442a in environment 404 as shown and described with reference to FIG. 4J). In some examples, electronic device 402 initiates the process for purchasing the one or more products in the digital shopping cart when the one or more devices located within the store detect and/or determine that the user of electronic device 402 is in possession of the one or more products and the one or more products have not yet been purchased (e.g., the one or more devices are in communication with electronic device 402, and in response to the one or more devices providing indications to electronic device 402, electronic device 402 presents virtual element 442a in environment 404 as shown and described with reference to FIG. 4J). In some examples, the one or more devices detect the one or more products through a bar code, label and/or other tag on the one or more products (e.g., on the packaging of the one or more products). In some examples, the one or more devices are optionally in communication with electronic device 402 and/or an application associated with the digital payment service, and the one or more devices detect the one or more products through the retrieval of information from the digital shopping cart. In some examples, electronic device 402 initiates the process for purchasing the one or more products in the digital shopping cart in response to detecting one or more objects in environment 404 associated with the exit of the store. For example, electronic device 402 detects (e.g., using image sensors 414a-414c (e.g., optionally through object or image recognition)) an exit sign and/or checkout counter 438 (e.g., in response to detecting the one or more objects in environment 404 associated with the exit of the store, electronic device 402 presents virtual element 442a in environment 404 as shown and described with reference to FIG. 4J).

FIG. 4J illustrates electronic device 402 presenting a virtual element 442a in environment 404 in response to the input provided by the user of electronic device 402 in FIG. 4I-2 (e.g., and/or in accordance with one or more criteria for accessing the digital payment service being satisfied). In some examples, virtual element 442a corresponds to a user interface of the digital shopping cart and/or of a digital payment service application. As shown in FIG. 4J, there are three products included in the digital shopping cart: screws (e.g., corresponding to first product 406); tape (e.g., corresponding to second product 436); and nails (e.g., corresponding to a third product (e.g., the third product is added to the digital shopping cart after the addition of first product 406 and second product 436)). In some examples, the screws, tape, and nails correspond to products included in a digital shopping list that is stored in a file of an application of electronic device 402 (e.g., as shown in FIG. 3G, the shopping list included in user interface 328 includes the products that are included in the digital shopping cart shown in FIG. 4J). In some examples, virtual element 442a includes the cost of each product and the total cost of the one or more products in the digital shopping cart. In some examples, in FIG. 4J, virtual element 442a includes a selectable option 444 that is selectable to complete the purchase of the one or more products in the digital shopping cart. In some examples, the digital shopping cart is optionally displayed via a display generation component (e.g., different from display generation component 430) in communication with electronic device 402. For example, electronic device 402 optionally does not include display generation component 430 and/or does not present virtual environment 404.

As shown in FIG. 4J, electronic device 402 detects the user of electronic device 402 providing an input corresponding to selection of selectable option 444 (e.g., the input corresponding to selection of selectable option 444 includes attention (e.g., gaze 422) directed to selectable option 444 and/or an air gesture performed using hand 408a, as similarly discussed above). In some examples, one or more user inputs different from selection of a selectable option are used for completing the purchase of the one or more products in the digital shopping cart. For example, electronic device 402 completes the purchase of the one or more products (e.g., through the digital payment service) in response to an input provided through a hardware device, such as hardware buttons 460a and 460b (e.g., the user of electronic device 402 double taps hardware button 460a and/or 460b, or the user of electronic device 402 performs a press-and-hold input using hardware button 460a and/or 460b). In some examples, electronic device 402 alternatively completes the purchase of the one or more products (e.g., through the digital payment service) in response to an audio input (e.g., a verbal command). In some examples, electronic device 402 completes the purchase of the one or more products in response to an input provided through a touch-sensitive surface (e.g., of a second device) in communication with electronic device 402.

In some examples, in response to the user input corresponding to a request to complete the purchase of the one or more products in the digital shopping cart (e.g., in response to the selection of selectable option 444 as shown in FIG. 4J), electronic device 402 purchases the one or more products via the digital payment service. In some examples, electronic device 402 presents one or more visual and/or audio indications indicating that the purchase of the one or more products is complete. For example, as shown in FIG. 4K, electronic device 402 presents a virtual element 442b in environment 404 corresponding to a visual indication indicating that the purchase of the one or more products included in the digital shopping cart is complete. In some examples, in addition to (e.g., or instead of) presenting virtual element 442b in environment 404, electronic device 402 provides an audio output to the user of electronic device 402 to provide indication that the purchase of the one or more products is complete. In some examples, presenting virtual element 442b in environment 404 includes one or more characteristics of presenting virtual element 418c in environment 404 as shown and described with reference to FIG. 4E. In some examples, electronic device 402 optionally does not include display generation component 430 and/or optionally does not present environment 404, and confirmation of the purchase of the one or more products is provided via a device in communication with electronic device 402. For example, a virtual element (e.g., including one or more characteristics of virtual element 442b) is displayed by a display component of the device in communication with electronic device 402 and/or an audio output is provided by a speaker of the device (e.g., the display of the virtual element and/or audio output is provided through interaction with an application associated with the digital payment service on the device in communication with electronic device 402).

Based on the completion of the purchase of the one or more products in the digital shopping cart, electronic device 402 concludes the augmented shopping experience (e.g., initiated in FIG. 4A) at which point the user of electronic device 402 can exit the store. In some examples, based on the purchase of the one or more products, electronic device 402 can update information associated with the one or more products stored in a repository of information (e.g., in a memory and/or in a file of an application). For example, the one or more products can be removed from a shopping list stored in a file of an application (e.g., removed from the digital shopping list shown in FIG. 3G) because electronic device 402 determines a quantity of the one or more products that the user of electronic device 402 is in possession of exceeds the threshold amount that is described with reference to FIGS. 3A-3I. In some examples, in accordance with a determination that the location of electronic device 402 is not within the region of the physical environment corresponding to the store and/or business (e.g., the user of electronic device 402 exits the store), electronic device 402 ceases to present virtual element 442b in environment 404. In some examples, electronic device 402 ceases to present virtual element 442b in environment 404 after 1, 2, 5, 10, 15 20, 25, 30, 45, 60 or 120 seconds of presentation time in environment 404. In some examples, electronic device 402 ceases to present virtual element 418c in response to a user input (e.g., having one or more characteristics of the user input for ceasing to present virtual element 418c in environment 404 described with reference to FIG. 4E).

Figure 5:
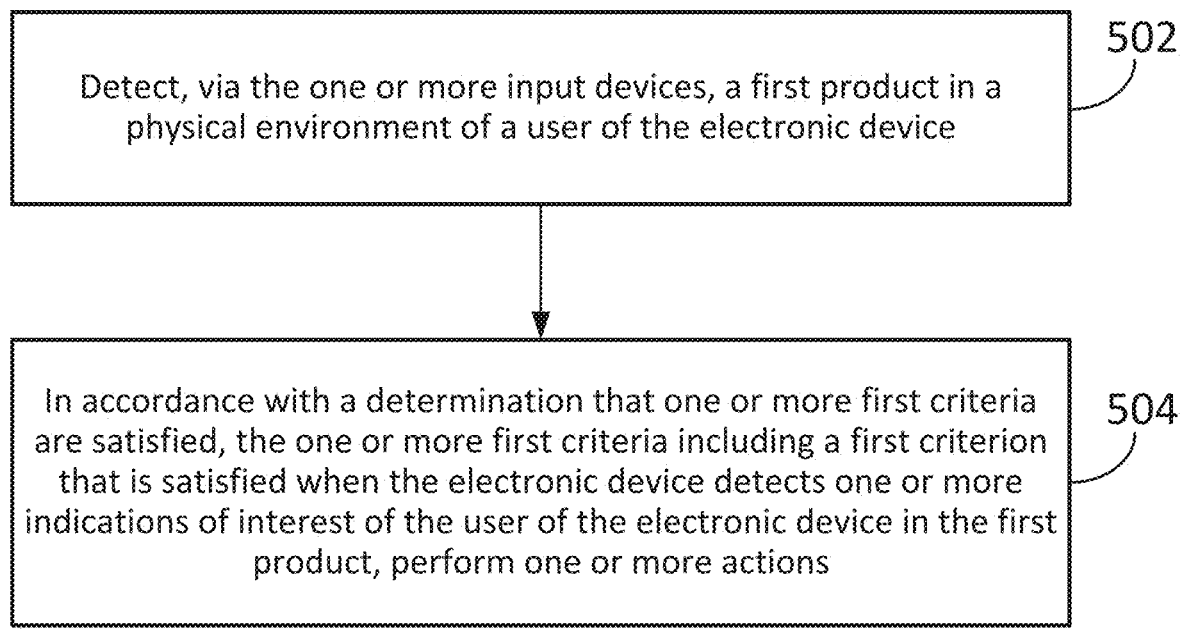
FIG. 5 illustrates a flow diagram for an example process for presenting one or more virtual elements in an environment that are associated with a product according to some examples of the disclosure.

FIG. 5 illustrates a flow diagram for an example process for presenting one or more virtual elements in an environment that are associated with a product that has a quantity that is less than a threshold amount, according to some examples of the disclosure. In some examples, process 500 begins at an electronic device in communication with one or more displays and one or more input devices. In some examples, electronic device is optionally a head-mounted display similar or corresponding to device 201 of FIG. 2. As shown in FIG. 5, in some examples, at 502, the electronic device detects, via the one or more input devices, a first product in a physical environment of a user of the electronic device. For example, as shown in FIG. 3A, electronic device 302 detects product 306 (e.g., a package of screws) in a physical environment of the user of electronic device 302.

In some examples, at 504, in accordance with a determination that one or more first criteria are satisfied, the one or more first criteria including a first criterion that is satisfied when the electronic device detects one or more indications of interest of the user of the electronic device in the first product, the electronic device performs one or more actions. In some examples, detecting the one or more indications of interest include detecting attention (e.g., gaze) that is directed to the first product (e.g., as described with reference to FIG. 3A). In some examples, detecting the one or more indications of interest include detecting user interaction with the first product in the physical environment (e.g., as shown and described with reference to FIG. 3B). In some examples, detecting the one or more indications of interest include detecting a hand gesture (e.g., an air gesture), such as the air gesture performed with hand 308 in FIG. 3C. In some examples, the one or more actions include presenting, via one or more displays in communication with the electronic device, one or more virtual elements in an environment, such as virtual element 318a as shown and described with reference to FIG. 3E. In some examples, the one or more virtual elements include one or more regions (e.g., stores/businesses) of the physical environment at which the first product can be purchased. In some examples, the one or more actions include adding information associated with the first product to a repository of information associated with a respective application. For example, as shown in FIG. 3G, electronic device 302 adds information associated with product 306 to a shopping list stored in a file of a respective application (e.g., which is accessible to the user of electronic device 302 through user interface 328).

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

FIG. 6 illustrates a flow diagram for an example process for presenting one or more virtual elements associated with one or more products in an environment based on a location of an electronic device, according to some examples of the disclosure. In some examples, process 600 begins at an electronic device in communication with one or more displays and one or more input devices. In some examples, the electronic device is optionally a head-mounted display similar or corresponding to device 201 of FIG. 2. As shown in FIG. 6, at 602, the electronic device detects a location of the electronic device in a physical environment. For example, as shown and described with reference to FIG. 4A, electronic device 402 detects that a location of electronic device 402 is within a store.

In some examples, at 604, in accordance with a determination that the location of the electronic device satisfies one or more first criteria, the one or more first criteria including a first criterion that is satisfied when the location of the electronic device is within a first region of the physical environment that includes a first location corresponding to a first product, wherein the first product is associated with one or more indications of user intent to purchase the first product and the one or more indications of the user intent are detected by the electronic device, the electronic device, at 606, presents, via the one or more displays, one or more first virtual elements in an environment indicating the first location of the first product within the first region of the physical environment (e.g., such as virtual elements 414, 416a and 416b shown and described with reference to FIG. 4B). For example, as shown and described with reference to FIG. 4A, electronic device 402 detects that a location of electronic device 402 is within a store that includes a first product (e.g., first product 406). For example, first product 406 corresponds to a product that is associated with one or more indications of user intent to purchase first product 406 that are detected by electronic device 402 (e.g., first product 406 corresponds to first product 306 shown and described with reference to FIGS. 3A-3F). In some examples, the product is included in a repository of information (e.g., previously stored by the electronic device in a memory and/or a file of an application). In some examples, the product is included in a shopping list included in a file of an application (e.g., as shown and described with reference to FIG. 3G).

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at an electronic device in communication with one or more input devices, detecting, via the one or more input devices, a first product in a physical environment of a user of the electronic device. In some examples, the method further comprises, in accordance with a determination that one or more first criteria satisfied, the one or more first criteria including a first criterion that is satisfied when the electronic device detects one or more indications of interest of the user of the electronic device in the first product, performing one or more actions.

Additionally, or alternatively, in some examples, the one or more actions include adding information associated with the first product to a repository of information associated with a respective application.

Additionally, or alternatively, in some examples, the one or more indications of interest of the user of the electronic device in the first product includes attention of the user of the electronic device directed to the first product.

Additionally, or alternatively, in some examples, the one or more indications of interest of the user of the electronic device in the first product include a hand gesture performed by the user of the electronic device directed to the first product.

Additionally, or alternatively, in some examples, the one or more indications of interest of the user of the electronic device in the first product include user interaction with the first product in the physical environment.

Additionally, or alternatively, in some examples, the electronic device is further in communication with one or more displays, and the one or more actions include presenting, via the one or more displays, a first virtual element associated with the first product in an environment.

Additionally, or alternatively, in some examples, presenting the first virtual element includes presenting a visual indication of a first region of the physical environment at which the first product is available to be purchased, wherein the first region is a closest region of one or more regions of the physical environment at which the first product is available for purchase relative to a location of the electronic device.

Additionally, or alternatively, in some examples, presenting the first virtual element includes presenting one or more visual indications of one or more regions of the physical environment at which the first product is available to be purchased, wherein the one or more visual indications of the one or more regions are presented based on the one or more regions being within a threshold distance of a location of the electronic device.

Additionally, or alternatively, in some examples, the one or more visual indications of the one or more regions of the physical environment includes presenting one or more visual indications of one or more distances of the one or more regions of the physical environment relative to the location of the electronic device.

Additionally, or alternatively, in some examples, the one or more regions of the physical environment correspond to one or more predetermined regions of the physical environment selected according to one or more preferences of the user of the electronic device.

Additionally, or alternatively, in some examples, the one or more regions of the physical environment correspond to one or more regions of the physical environment selected according to a user history stored by the electronic device.

Additionally, or alternatively, in some examples, presenting the one or more visual indications of the one or more regions of the physical environment includes presenting a visual indication of a first quantity of the first product that is available for purchase at a first region of the one or more regions of the physical environment.

Additionally, or alternatively, in some examples, the method further comprises, while presenting the first virtual element in the environment, detecting, via the one or more input devices, a first input corresponding to user interaction with the first virtual element, wherein the user interaction corresponds to an indication of user intent to purchase the first product; and in response to receiving the first input, storing information associated with the user intent to purchase the first product.

Additionally, or alternatively, in some examples, the method further comprises, while presenting the first virtual element in the environment, detecting, via the one or more input devices, a first input satisfying one or more second criteria; and in response to receiving the first input, ceasing to present the first virtual element in the environment.

Additionally, or alternatively, in some examples, the method further comprises, after performing the one or more actions, in accordance with a determination that the location of the electronic device is within a first region of the physical environment at which the first product is available to be purchased, presenting, via the one or more displays, one or more first virtual elements in the environment indicating a first location of the first product within the first region of the physical environment.

Additionally, or alternatively, in some examples, the method further comprises, after performing the one or more actions, in accordance with a determination that one or more second criteria are satisfied, presenting, via one or more displays, one or more first virtual elements indicating that the first product is available for purchase within a first region of the physical environment.

Additionally, or alternatively, in some examples, the one or more first criteria include a second criterion that is satisfied in accordance with a determination that a quantity of the first product is less than a threshold amount.

Additionally, or alternatively, in some examples, the one or more input devices include one or more image sensors and determining that the quantity of the first product is less than the threshold amount includes detecting the quantity of the first product using the one or more image sensors.

Additionally, or alternatively, in some examples, the one or more input devices include one or more audio sensors and determining that the quantity of the first product is less than the threshold amount includes detecting an audio input corresponding to a sound emitted from the first product using the one or more audio sensors.

Additionally, or alternatively, in some examples, the electronic device includes a head-mounted display.

According to the above, some examples of the disclosure are directed to a method comprising, at an electronic device in communication with one or more displays and one or more input devices, detecting a location of the electronic device in a physical environment. In some examples, the method further comprises, in accordance with a determination that the location of the electronic device satisfies one or more first criteria, the one or more first criteria including a first criterion that is satisfied when the location of the electronic device is within a first region of the physical environment that includes a first location corresponding to a first product, wherein the first product is associated with one or more indications of user intent to purchase the first product and the one or more indications of the user intent are detected by the electronic device, presenting, via the one or more displays, one or more first virtual elements in an environment indicating the first location of the first product within the first region of the physical environment.

Additionally, or alternatively, in some examples, the method further comprises, in accordance with a determination that the location of the electronic device satisfies the one or more first criteria and one or more second criteria, the one or more second criteria including a second criterion that is satisfied when the first product is in a field of view of a user of the electronic device, presenting, via the one or more displays, one or more second virtual elements, different from the one or more first virtual elements, in the environment associated with the first product.

Additionally, or alternatively, in some examples, the method further comprises, while displaying the one or more second virtual elements, detecting, via the one or more input devices, a first input corresponding to user interaction with the one or more second virtual elements; and in response to detecting the first input, adding the first product to a digital shopping cart.

Additionally, or alternatively, in some examples, the method further comprises, after adding the first product to the digital shopping cart, detecting, via the one or more input devices, a second input satisfying one or more criteria for initiating purchase of one or more products, including the first product, included in the digital shopping cart; and in response to detecting the second input, facilitating the purchase of the one or more products.

Additionally, or alternatively, in some examples, the method further comprises, after adding the first product to the digital shopping cart, in accordance with a determination that one or more second criteria are satisfied, presenting, via the one or more displays, one or more second virtual elements in the environment associated with a second product, different from the first product, that is available for purchase within the first region of the physical environment.

Additionally, or alternatively, in some examples, the one or more indications of the user intent are detected by the electronic device at a second location outside of the first region of the physical environment.

Additionally, or alternatively, in some examples, the one or more indications of the user intent include a first indication corresponding to information associated with the first product stored in a file of a respective application.

Additionally, or alternatively, in some examples, the file of the respective application includes information associated with a plurality of products including the first product. In some examples, the method further comprises, in accordance with a determination that the first region of the physical environment includes a second location corresponding to a second product, different from the first product, of the plurality of products, presenting, via the one or more displays, one or more second virtual elements in the environment indicating the second location of the second product within the first region of the physical environment.

Additionally, or alternatively, in some examples, the method further comprises, while presenting the one or more first virtual elements in the environment, detecting, via the one or more input devices, a first input satisfying one or more second criteria; and in response to receiving the first input, ceasing to present the one or more first virtual element in the environment.

Additionally, or alternatively, in some examples, the electronic device includes a head-mounted display.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The present disclosure contemplates that in some instances, the data utilized may include personal information data that uniquely identifies or can be used to contact or locate a specific person. Such personal information data can include demographic data, content consumption activity, location-based data, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content consumption activity can be used to suggest content to a user. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking. In addition to providing "opt in" and "opt out" options, the present disclosure contemplates providing notifications relating to the access or use of personal information. For instance, a user may be notified upon initiating content playback that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, synchronized media and communication session interactions can proceed in accordance with the embodiments of the disclosure without tracking the content consumption activity of the user.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method, comprising:
at an electronic device in communication with one or more input devices:
detecting, via the one or more input devices, a first product in a physical environment of a user of the electronic device; and
in accordance with a determination that one or more first criteria are satisfied, the one or more first criteria including a first criterion that is satisfied when the electronic device detects one or more indications of interest of the user of the electronic device in the first product and a second criterion that is satisfied in accordance with a determination that a quantity of the first product is less than a threshold amount, performing one or more actions, wherein the one or more indications of interest of the user of the electronic device in the first product include a physical user interaction with the first product in the physical environment.

2. The method of claim 1, wherein the one or more actions include adding information associated with the first product to a repository of information associated with a respective application.

3. The method of claim 1, wherein the one or more indications of interest of the user of the electronic device in the first product includes attention of the user of the electronic device directed to the first product.

4. The method of claim 1, wherein the one or more indications of interest of the user of the electronic device in the first product include a hand gesture performed by the user of the electronic device directed to the first product.

5. The method of claim 1, wherein the electronic device is further in communication with one or more displays, and wherein the one or more actions include presenting, via the one or more displays, a first virtual element associated with the first product in an environment.

6. The method of claim 5, wherein presenting the first virtual element includes presenting one or more visual indications of one or more regions of the physical environment at which the first product is available to be purchased, wherein the one or more visual indications of the one or more regions are presented based on the one or more regions being within a threshold distance of a location of the electronic device.

7. The method of claim 1, further comprising:
after performing the one or more actions, in accordance with a determination that one or more second criteria are satisfied, presenting, via one or more displays, one or more first virtual elements indicating that the first product is available for purchase within a first region of the physical environment.

8. The method of claim 1, wherein the one or more input devices include one or more image sensors and determining that the quantity of the first product is less than the threshold amount includes detecting the quantity of the first product using the one or more image sensors.

9. An electronic device comprising:
one or more processors;
memory; and
one or more programs stored in the memory and configured to be executed by the one or more processors, the one or more programs including instructions for performing a method comprising:
detecting, via one or more input devices, a first product in a physical environment of a user of the electronic device; and
in accordance with a determination that one or more first criteria are satisfied, the one or more first criteria including a first criterion that is satisfied when the electronic device detects one or more indications of interest of the user of the electronic device in the first product and a second criterion that is satisfied in accordance with a determination that a quantity of the first product is less than a threshold amount, performing one or more actions, wherein the one or more indications of interest of the user of the electronic device in the first product include a physical user interaction with the first product in the physical environment.

10. The electronic device of claim 9, wherein the one or more actions include adding information associated with the first product to a repository of information associated with a respective application.

11. The electronic device of claim 9, wherein the one or more indications of interest of the user of the electronic device in the first product includes attention of the user of the electronic device directed to the first product.

12. The electronic device of claim 9, wherein the one or more indications of interest of the user of the electronic device in the first product include a hand gesture performed by the user of the electronic device directed to the first product.

13. The electronic device of claim 9, wherein the electronic device is further in communication with one or more displays, and wherein the one or more actions include presenting, via the one or more displays, a first virtual element associated with the first product in an environment.

14. The electronic device of claim 13, wherein presenting the first virtual element includes presenting one or more visual indications of one or more regions of the physical environment at which the first product is available to be purchased, wherein the one or more visual indications of the one or more regions are presented based on the one or more regions being within a threshold distance of a location of the electronic device.

15. The electronic device of claim 9, the method further comprising:
after performing the one or more actions, in accordance with a determination that one or more second criteria are satisfied, presenting, via one or more displays, one or more first virtual elements indicating that the first product is available for purchase within a first region of the physical environment.

16. The electronic device of claim 9, wherein the one or more input devices include one or more image sensors and determining that the quantity of the first product is less than the threshold amount includes detecting the quantity of the first product using the one or more image sensors.

17. A non-transitory computer readable storage medium storing one or more programs, the one or more programs comprising instructions, which when executed by one or more processors of an electronic device, cause the electronic device to perform a method comprising:
detecting, via one or more input devices, a first product in a physical environment of a user of the electronic device; and
in accordance with a determination that one or more first criteria are satisfied, the one or more first criteria including a first criterion that is satisfied when the electronic device detects one or more indications of interest of the user of the electronic device in the first product and a second criterion that is satisfied in accordance with a determination that a quantity of the first product is less than a threshold amount, performing one or more actions, wherein the one or more indications of interest of the user of the electronic device in the first product include a physical user interaction with the first product in the physical environment.

18. The non-transitory computer readable storage medium of claim 17, wherein the one or more actions include adding information associated with the first product to a repository of information associated with a respective application.

19. The non-transitory computer readable storage medium of claim 17, wherein the one or more indications of interest of the user of the electronic device in the first product includes attention of the user of the electronic device directed to the first product.

20. The non-transitory computer readable storage medium of claim 17, wherein the one or more indications of interest of the user of the electronic device in the first product include a hand gesture performed by the user of the electronic device directed to the first product.

21. The non-transitory computer readable storage medium of claim 17, wherein the electronic device is further in communication with one or more displays, and wherein the one or more actions include presenting, via the one or more displays, a first virtual element associated with the first product in an environment.

22. The non-transitory computer readable storage medium of claim 21, wherein presenting the first virtual element includes presenting one or more visual indications of one or more regions of the physical environment at which the first product is available to be purchased, wherein the one or more visual indications of the one or more regions are presented based on the one or more regions being within a threshold distance of a location of the electronic device.

23. The non-transitory computer readable storage medium of claim 17, the method further comprising:
after performing the one or more actions, in accordance with a determination that one or more second criteria are satisfied, presenting, via one or more displays, one or more first virtual elements indicating that the first product is available for purchase within a first region of the physical environment.

24. The non-transitory computer readable storage medium of claim 17, wherein the one or more input devices include one or more image sensors and determining that the quantity of the first product is less than the threshold amount includes detecting the quantity of the first product using the one or more image sensors.

* * * * *